(12) United States Patent
Ishimori

(10) Patent No.: US 10,473,760 B2
(45) Date of Patent: Nov. 12, 2019

(54) RADAR DEVICE AND VERTICAL AXIS-MISALIGNMENT DETECTING METHOD

(71) Applicant: FUJITSU TEN LIMITED, Kobe-shi, Hyogo (JP)

(72) Inventor: Hiroyuki Ishimori, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 298 days.

(21) Appl. No.: 15/599,808

(22) Filed: May 19, 2017

(65) Prior Publication Data

US 2017/0363718 A1    Dec. 21, 2017

(30) Foreign Application Priority Data

Jun. 20, 2016   (JP) ................. 2016-121949

(51) Int. Cl.
| | | |
|---|---|---|
| G01S 7/40 | (2006.01) | |
| G01S 13/50 | (2006.01) | |
| G01S 13/93 | (2006.01) | |
| G01S 13/34 | (2006.01) | |
| G01S 13/536 | (2006.01) | |
| G01S 13/58 | (2006.01) | |
| G01S 7/35 | (2006.01) | |

(52) U.S. Cl.
CPC .............. *G01S 7/40* (2013.01); *G01S 7/4026* (2013.01); *G01S 13/34* (2013.01); *G01S 13/345* (2013.01); *G01S 13/50* (2013.01); *G01S 13/536* (2013.01); *G01S 13/584* (2013.01); *G01S 13/931* (2013.01); *G01S 2007/356* (2013.01); *G01S 2007/4034* (2013.01); *G01S 2007/4091* (2013.01)

(58) Field of Classification Search
CPC ........ G01S 7/40; G01S 13/584; G01S 13/536; G01S 13/345; G01S 13/34; G01S 13/931; G01S 13/50; G01S 7/4026; G01S 2007/4091; G01S 2007/356; G01S 2007/4034
USPC ........................................... 342/70
See application file for complete search history.

(56) References Cited

U.S. PATENT DOCUMENTS

| | | | | | |
|---|---|---|---|---|---|
| 6,025,797 | A | * | 2/2000 | Kawai ................ | B60K 31/0008 342/175 |
| 6,087,995 | A | * | 7/2000 | Grace ................... | G01S 7/4017 340/903 |

(Continued)

FOREIGN PATENT DOCUMENTS

| | | |
|---|---|---|
| JP | 2002-228749 A | 8/2002 |
| JP | 2007-248056 A | 9/2007 |

(Continued)

*Primary Examiner* — Frank J McGue
(74) *Attorney, Agent, or Firm* — Oliff PLC

(57) ABSTRACT

There is provided a radar device which is mounted on a moving object and configured to detect a target on the basis of reception signals acquired by receiving reflected waves from the target by receiving antennae. A transmitting unit has a transmission axis substantially parallel to a traveling direction of the moving object. The transmitting unit is configured to transmit transmission waves around the transmission axis as a center thereof. A determining unit is configured to determine upward axis misalignment or downward axis misalignment of the transmission axis, on the basis of the reception signals acquired by receiving the reflected waves of the transmission waves.

19 Claims, 16 Drawing Sheets

(56) References Cited

U.S. PATENT DOCUMENTS

| | | | | |
|---|---|---|---|---|
| 6,556,166 B1* | 4/2003 | Searcy | ............ | G01S 7/4026 |
| | | | | 342/165 |
| 6,636,172 B1* | 10/2003 | Prestl | ............ | G01S 7/4026 |
| | | | | 342/173 |
| 2002/0165650 A1* | 11/2002 | Michi | ............ | G01S 7/4026 |
| | | | | 701/33.1 |
| 2007/0179712 A1* | 8/2007 | Brandt | ............ | G01S 13/931 |
| | | | | 701/300 |
| 2010/0057293 A1* | 3/2010 | Hoetzer | ............ | G01S 7/4026 |
| | | | | 701/29.2 |
| 2013/0154870 A1* | 6/2013 | Mills | ............ | G01S 13/931 |
| | | | | 342/70 |

FOREIGN PATENT DOCUMENTS

| | | |
|---|---|---|
| JP | 2010-210483 A | 9/2010 |
| JP | 4740449 B2 | 8/2011 |
| JP | 2014-153256 A | 8/2014 |
| JP | 2015-014593 A | 1/2015 |

* cited by examiner

US 10,473,760 B2

RADAR DEVICE AND VERTICAL AXIS-MISALIGNMENT DETECTING METHOD

CROSS-REFERENCE TO RELATED APPLICATIONS

This application is based on and claims priority from Japanese Patent Application No. 2016-121949 filed on Jun. 20, 2016.

TECHNICAL FIELD

The present invention relates to a radar device and a vertical axis-misalignment detecting method.

RELATED ART

In the related art, for example, radar devices which can be mounted, for example, on vehicles, and are configured to transmit transmission waves from vehicles equipped with the radar devices, and receives reflected waves of the transmission waves from targets by a plurality of receiving antennae, and calculate the horizontal angle of each target on the basis of the phase differences between a plurality of reflected waves received from the corresponding target are known.

Some of such radar devices are mounted, for example, on the rear surfaces of the bumpers of vehicles. In this case, for example, even if a vehicle causes a minor collision, the transmission axis of transmission waves may become misaligned.

With respect to transmission axis misalignment, for example, a radar device for detecting axis misalignment in the horizontal direction on the basis of target position information items including calculated horizontal angles has been proposed (see Patent Document 1 for instance).

Patent Document 1: Japanese Patent Application Publication No. 2007-248056A

However, the above-mentioned technology of the related art has a problem in which it cannot detect axis misalignment in the vertical direction.

SUMMARY

It is therefore an object of the present invention to provide a radar device and a vertical axis-misalignment detecting method capable of detecting axis misalignment in the vertical direction with high accuracy.

According to an aspect of the embodiments of the present invention, there is provided a radar device which is mounted on a moving object and configured to detect a target on the basis of reception signals acquired by receiving reflected waves from the target by receiving antennae, the radar device comprising: a transmitting unit having a transmission axis substantially parallel to a traveling direction of the moving object and configured to transmit transmission waves around the transmission axis as a center thereof; and a determining unit configured to determine upward axis misalignment or downward axis misalignment of the transmission axis, on the basis of the reception signals acquired by receiving the reflected waves of the transmission waves.

According to the aspect of the present embodiment, it is possible to detect axis misalignment in the vertical direction with high accuracy.

BRIEF DESCRIPTION OF THE DRAWINGS

Exemplary embodiments of the present invention will be described in detailed based on the following figures, wherein.

DETAILED DESCRIPTION

Hereinafter, an embodiment of a radar device and a vertical axis-misalignment detecting method according to the present invention will be described in detail with reference to the accompanying drawings. However, the present invention is not limited to the following embodiment.

Also, hereinafter, axis misalignment in the vertical direction means that the transmission axis of the radar device has shifted upward or downward. Therefore, an upward axis shift hereinafter will be referred to as upward axis misalignment. Also, similarly, a downward axis shift hereinafter will be referred to as downward axis misalignment.

Hereinafter, an overview of a vertical axis-misalignment detecting method according to the present embodiment will be first described with reference to FIGS. 1A to 1G, and then a radar device using the vertical axis-misalignment detecting method according to the embodiment will be described with reference to FIGS. 2 to 7E.

First, an overview of the vertical axis-misalignment detecting method according to the present embodiment will be described with reference to FIGS. 1A to 1G. FIGS. 1A to 1G are views for explaining overviews of first to seventh parts of the vertical axis-misalignment detecting method accuracy of the embodiment, respectively.

Figure 1A:
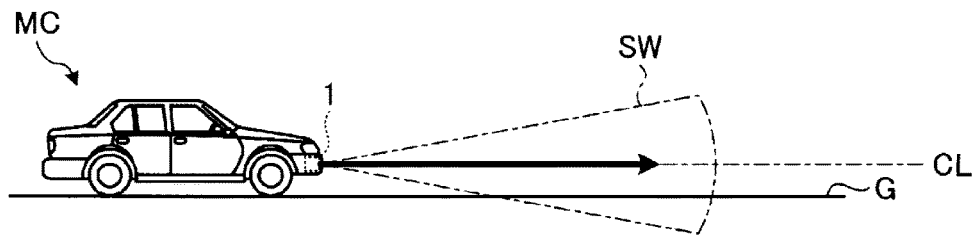
FIG. 1A is an explanatory view illustrating an overview of a first part of a vertical axis-misalignment detecting method according to an embodiment.

As shown in FIG. 1A, a radar device 1 is mounted, for example, on the rear surface of the front bumper of a vehicle MC, and detects targets existing in the traveling direction of the vehicle MC. However, the radar device 1 does not necessarily need to be installed only on a front bumper, and may be installed at any other position such as front glass, a rear grill, or a left or right part (for example, a left door mirror or a right door mirror).

The radar device 1 transmits transmission waves SW around a transmission axis CL as a center thereof. The transmission axis is substantially parallel to the traveling direction of the vehicle MC running on a road G. In a case where there is a target in the transmission range of a transmission wave SW, reflected waves of the transmission wave SW from the target come to the radar device. The radar device 1 receives the reflected waves, and detects the angle, distance, relative velocity, and so on of the target relative to the radar device, on the basis of the reception signals.

Figure 1B:
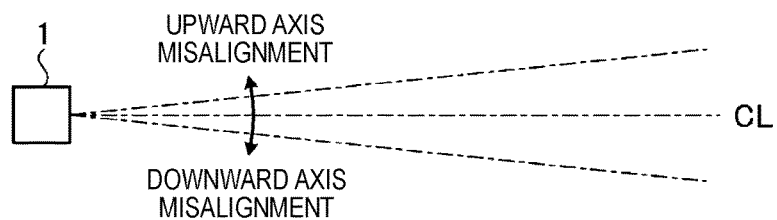
FIG. 1B is an explanatory view illustrating an overview of a second part of the vertical axis-misalignment detecting method according to the embodiment.

By the way, the vehicle MC may cause a minor collision with a different target, for example, due to a driver's operation mistake. A minor collision means a fender bender such as a collision of the front bumper with a wall, and may cause the position of the radar device 1 to shift, resulting in upward axis misalignment or downward axis misalignment of the transmission axis CL as shown in FIG. 1B.

Figure 1C:
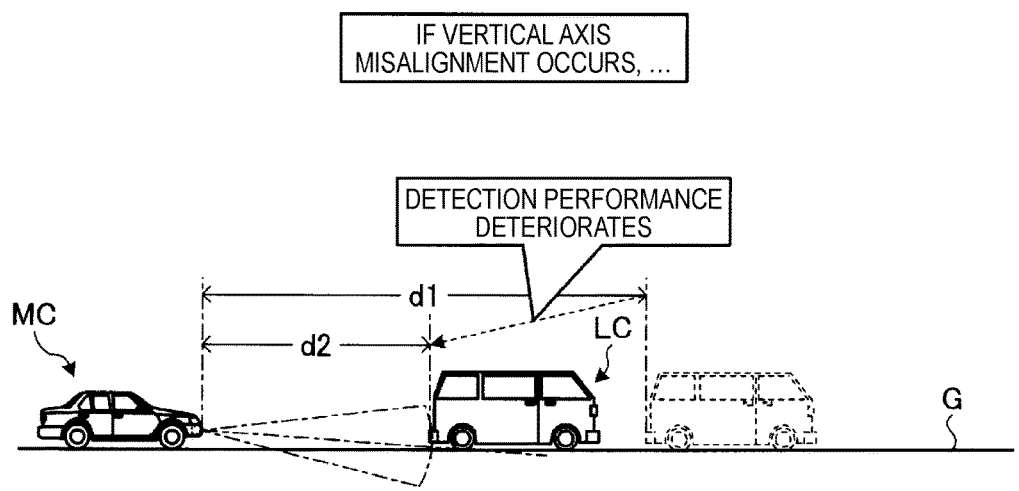
FIG. 1C is an explanatory view illustrating an overview of a third part of the vertical axis-misalignment detecting method according to the embodiment.

When it is assumed that when the radar device which is in the right position can detect preceding vehicles LC within a detection distance d1, for example, if axis misalignment in the vertical direction occurs as shown in FIG. 1C, the detection distance d1 decreases to a detection distance d2. In other words, the detection performance of the radar device 1 deteriorates.

Therefore, in the present embodiment, in order to detect axis misalignment in the vertical direction, whether the vehicle MC is in a running condition representing deterioration of detection performance attributable to axis misalignment in the vertical direction is determined on the basis of reception signals acquired by receiving reflected waves.

Figure 1D:
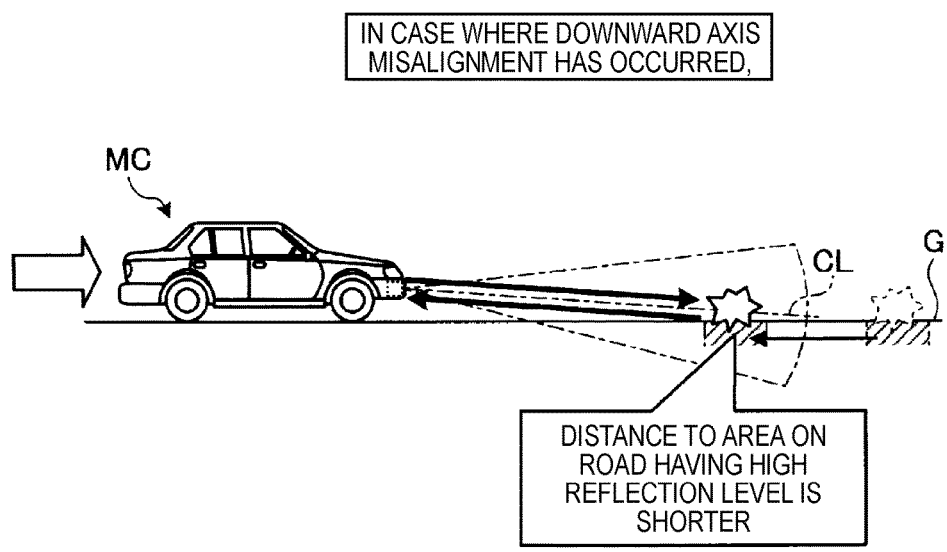
FIG. 1D is an explanatory view illustrating an overview of a fourth part of the vertical axis-misalignment detecting method according to the embodiment.

Specifically, as shown in FIG. 1D, in a case where the downward axis misalignment has occurred, when the vehicle MC is running at a predetermined velocity or more, the reflection level of the road in the shorter distance area becomes high, as compared with a case where the downward axis misalignment has not occurred. The radar device 1 according to the present embodiment performs a downward-axis-misalignment determining process of determining whether a running condition representing deterioration of detection performance attributable to downward axis misalignment has occurred by performing analysis on the basis of reception signals acquired by receiving reflected waves.

Figure 1E:
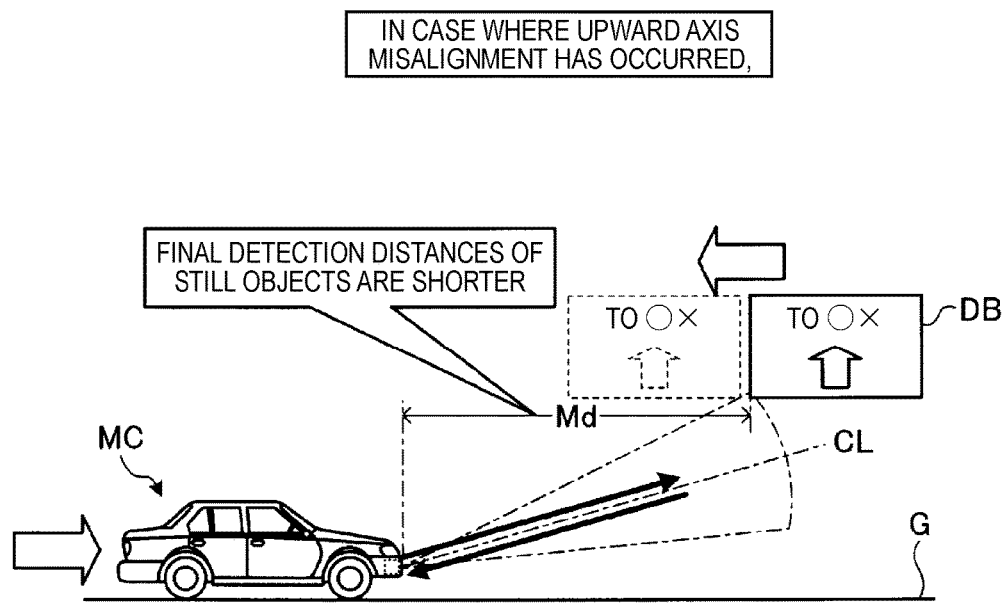
FIG. 1E is an explanatory view illustrating an overview of a fifth part of the vertical axis-misalignment detecting method according to the embodiment.

Also, as shown in FIG. 1E, when the vehicle MC is running at a predetermined velocity or more, still objects like a destination guide sign DB approach the vehicle MC at a relative velocity having the opposite sign to that of the velocity of the vehicle MC and having the same magnitude as that of the vehicle MC, and disappear from the detection range. The distance to a position at which a still object disappears will be referred to as a final detection distance Md.

In a case where the upward axis misalignment has occurred, when the vehicle MC is running at a predetermined velocity or more, the final detection distances Md of still objects become shorter, as compared with a case where the upward axis misalignment has not occurred. The radar device 1 according to the present embodiment performs an upward-axis-misalignment determining process of determining whether a running condition representing deterioration of detection performance attributable to upward axis misalignment has occurred by performing analysis on the basis of reception signals acquired by receiving reflected waves.

In these ways, it is possible to detect downward axis misalignment or upward axis misalignment. The detailed contents of the downward-axis-misalignment determining process and the upward-axis-misalignment determining process will be described below with respect to FIG. 6A and the subsequent drawings.

Figure 1F:
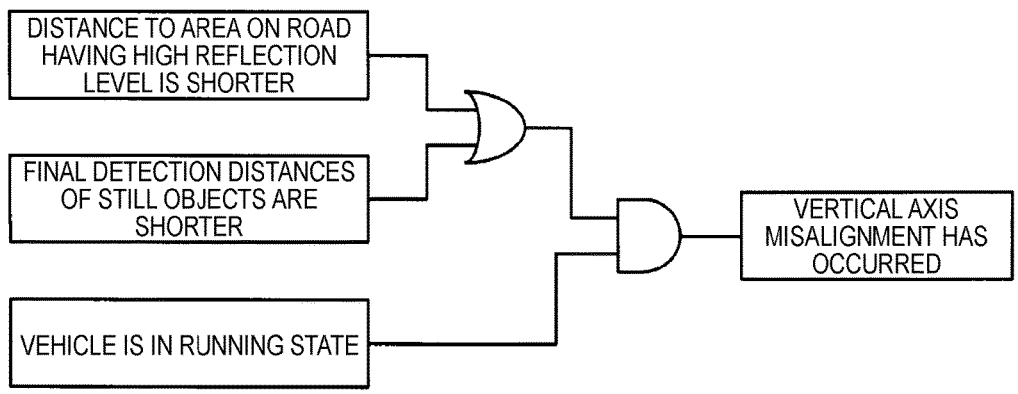
FIG. 1F is an explanatory view illustrating an overview of a sixth part of the vertical axis-misalignment detecting method according to the embodiment.

Therefore, as shown in FIG. 1F, in a case where it is determined in the downward-axis-misalignment determining process that the reflection level of the road G in the shorter distance area become high, or it is determined in the upward-axis-misalignment determining process that the final detection distance Md of still objects become shorter, and it is determined that the vehicle MC is in a running state, the radar device 1 according to the present embodiment determines that the axis misalignment in the vertical direction has occurred.

Figure 1G:
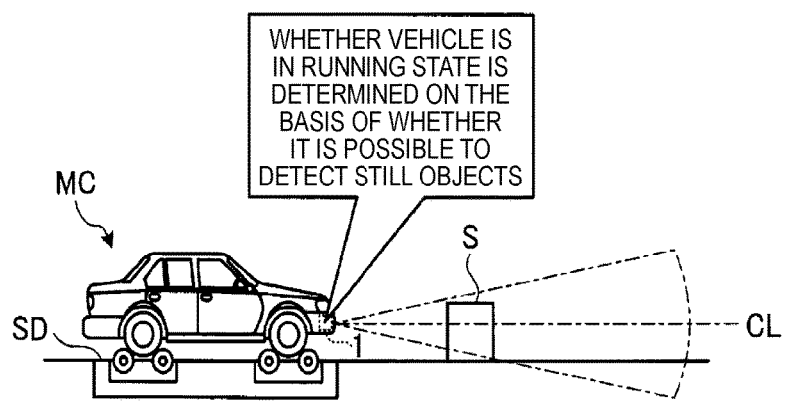
FIG. 1G is an explanatory view illustrating an overview of a seventh part of the vertical axis-misalignment detecting method according to the embodiment.

The running state exactly means a state in which the vehicle MC is actually moving in a direction according to a driver's operation at a velocity according to a driver's operation. As shown in FIG. 1G, for example, in a case where the vehicle MC is on a chassis dynamometer SD for an evaluation test, maintenance, or the like, even if a driver operates the vehicle such that the vehicle runs at an arbitrary velocity, the vehicle MC just runs idle on the chassis dynamometer SD, and the vehicle MC cannot actually move.

Therefore, in this case, if there is a still object S such as an evaluation device or a maintenance device in the detection range of the radar device 1, the radar device 1 erroneously detects the still object S as a moving object moving in the same direction at the same velocity with respect to the vehicle MC while keeping a constant distance from the vehicle MC.

Therefore, the radar device 1 according to the present embodiment performs a running-state determining process of determining whether the vehicle is in the running state on the basis of whether it is possible to detect still objects S. As a result, it is possible to prevent determination from being erroneously performed when the vehicle is not in the running state, and detect downward axis misalignment and upward axis misalignment with high accuracy. In other words, it is possible to perform an evaluation test or maintenance on the vehicle MC using the chassis dynamometer SD, without changing the control program of the radar device 1 at all.

Also, as shown in FIG. 1F, in a case of determining that axis misalignment in the vertical direction has occurred, the radar device 1 according to the present embodiment outputs the determination result as a diagnosis signal (hereinafter, such output will be referred to as output of a diagnosis). In this way, it is possible to detect axis misalignment of the radar device 1 in the vertical direction by diagnosis. Therefore, it is possible to contribute to improvement of maintainability.

As described above, in the present embodiment, the radar device 1 determines whether the vehicle is in a moving condition representing deterioration of target detecting performance attributable to axis misalignment of the transmission axis in the vertical direction and whether the vehicle is in an actually moving state. Subsequently, on the basis of the determination results, the radar device detects axis misalignment of the transmission axis CL in the vertical direction. Therefore, according to the present embodiment, it is possible to detect axis misalignment in the vertical direction with high accuracy.

Hereinafter, the radar device 1 using the above-described vertical axis-misalignment detecting method will be described in more detail.

Figure 2:
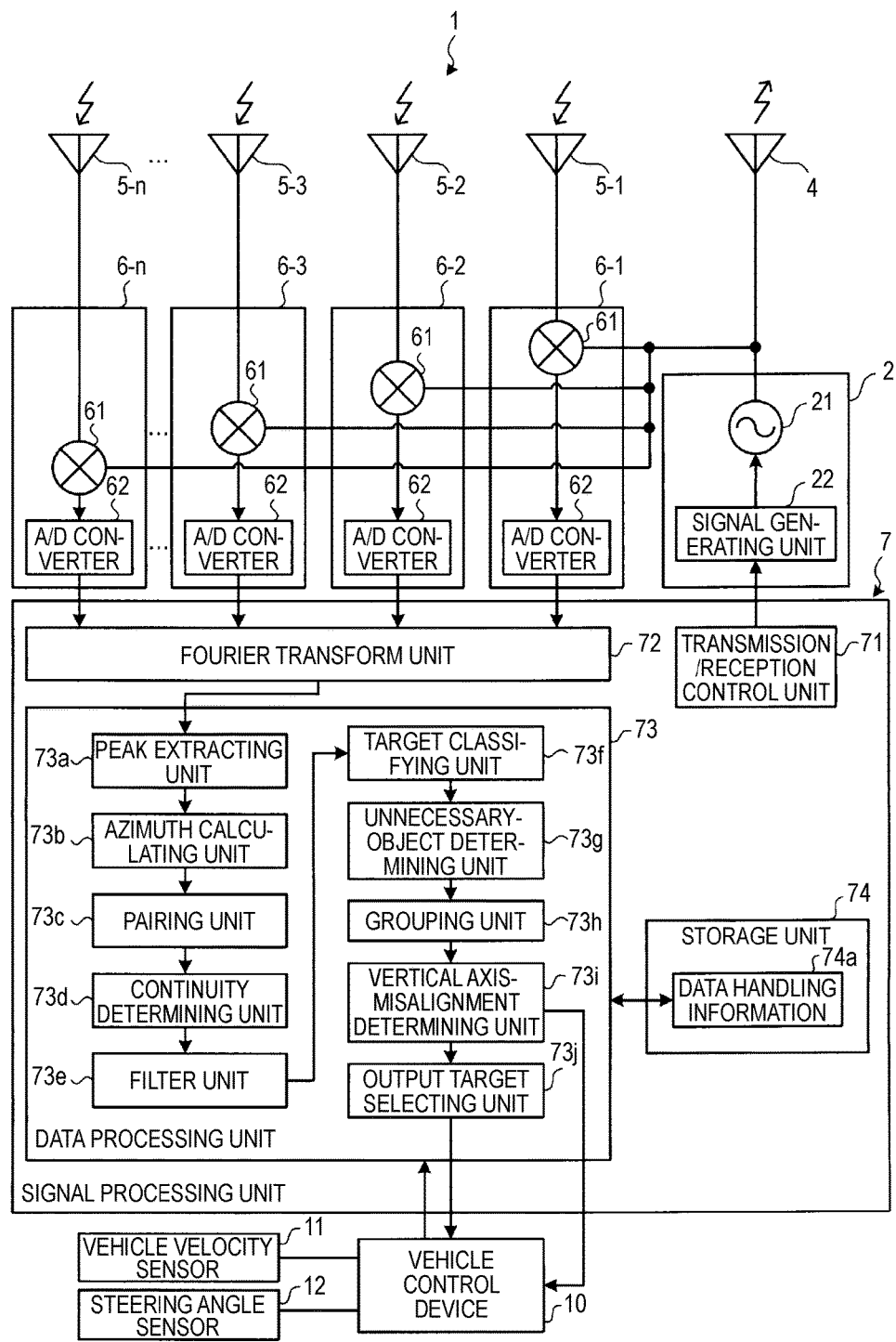
FIG. 2 is a block diagram illustrating a radar device according to the embodiment.

FIG. 2 is a block diagram illustrating the radar device 1 according to the embodiment. In FIG. 2, only components necessary for explaining features of the present embodiment are shown by functional blocks, and general components are not shown.

In other words, the components shown in FIG. 2 are functionally conceptual, and do not need to have a physically configuration as shown in FIG. 2. For example, distribution or integration of the individual functional blocks is not limited to a specific mode shown in FIG. 2, and it is possible to distribute or integrate all or a part thereof functionally or physically in an arbitrary unit, depending on various loads, usage conditions, and so on.

As shown in FIG. 2, the radar device 1 includes a signal transmitting unit 2 and a transmitting antenna 4 as components constituting a signal transmitting system. The transmitting unit 2 includes an oscillator 21 and a signal generating unit 22.

Also, the radar device 1 includes receiving antennas 5-1 to 5-$n$ and signal receiving units 6-1 to 6-$n$ as components constituting a signal receiving system. Each of the signal receiving units 6-1 to 6-$n$ includes a mixer 61 and an A/D converter 62. Further, the radar device 1 includes a signal processing unit 7 as a component constituting a signal processing system.

Also, hereinafter, for ease of explanation, the receiving antennae 5-1 to 5-$n$ will be collectively referred to as receiving antennae 5. Similarly, the signal receiving units 6-1 to 6-$n$ also will be collectively referred to as signal receiving units 6.

The transmitting unit 2 performs a process of generating transmission signals. In a frequency-modulated continuous-wave (FMCW) mode, the signal generating unit 22 generates modulation instruction signals for transmitting frequency-modulated millimeter waves having a triangular waveform, under control of a transmission/reception control unit 71 of the signal processing unit 7 to be described below.

Also, in a continuous-wave (CW) mode, the signal generating unit 22 generates modulation instruction signals for transmitting unmodulated millimeter waves having a constant frequency, under control of the transmission/reception control unit 71. The oscillator 21 generates transmission signals on the basis of modulation instruction signals generated by the signal generating unit 22. Also, the transmission/reception control unit 71 controls on switching between the FMCW mode and the CW mode, for example, at intervals of several tens milliseconds, such that both modes are repeated.

The transmitting antenna 4 transmits transmission signals generated by the oscillator 42, as transmission waves, forward from the vehicle MC. Also, as shown in FIG. 2, transmission signals generated by the oscillator 21 are distributed even to the mixers 61 to be described below.

If transmission waves transmitted from the transmitting antenna 4 are reflected from targets, the receiving antennae 5 receive the reflected waves coming from the targets, as reception signals. Each of the signal receiving units 6 performs a preliminary process on each reception signal, thereby generating signals to be output to the signal processing unit 7.

Specifically, each of the mixers 61 mixes transmission signals distributed as described above, with reception signals received by a corresponding receiving antenna 5, thereby generating beat signals. Also, between each of the pairs of the receiving antennae 5 and the mixers 61, an amplifier may be disposed.

The A/D converters 62 convert beat signals generated by the mixers 61, into digital signals, and outputs the digital signals to the signal processing unit 7.

The signal processing unit 7 includes the transmission/reception control unit 71, a Fourier transform unit 72, a data processing unit 73, and a storage unit 74.

The data processing unit 73 includes a peak extracting unit 73$a$, an azimuth calculating unit 73$b$, a pairing unit 73$c$, a continuity determining unit 73$d$, a filter unit 73$e$, a target classifying unit 73$f$, an unnecessary-object determining unit 73$g$, a grouping unit 73$h$, a vertical axis-misalignment determining unit 73$i$, and an output target selecting unit 73$j$.

The storage unit 74 is a storage device such as a hard disk, a non-volatile memory, or a register, and in the storage unit 74, data handling information 74$a$ is stored. The data handling information 74$a$ includes a variety of information such as thresholds to be used in the individual processing units 73$a$ to 73$j$ of the data processing unit 73, a variety of information necessary to perform data processing, data processing results of the individual processing units 73$a$ to 73$j$, and so on. Therefore, whenever each of the individual processing units 73$a$ to 73$j$ obtains a data processing result, the data processing result is written in the data handling information 74$a$.

The transmission/reception control unit 71 controls the signal transmitting unit 2 including the signal generating unit 22 and the oscillator 21. Although not shown in FIG. 2, the transmission/reception control unit 71 also controls the signal receiving units 6.

The Fourier transform unit 72 performs Fourier transform on beat signals input from the A/D converters 62, and then outputs the beat signals to the peak extracting unit 73$a$ of the data processing unit 73.

The peak extracting unit 73$a$ extracts peak frequencies of peaks from the Fourier transform results of the Fourier transform unit 72. Then, the control object is transitioned to the azimuth calculating unit 73$b$. Also, in the FMCW mode, the peak extracting unit 73$a$ extracts peak frequencies of UP sections and DOWN sections of beat signals (to be described below), respectively. Hereinafter, the FMCW mode will be mainly described. Peak extraction results which are obtained in the CW mode are used mainly for securing accuracy of processing results in the FMCW mode, and are used in running-state determining processes of the vertical axis-misalignment determining unit 73i to be described below.

The azimuth calculating unit 73b calculates the incident angles and intensities (reception levels) of reflected waves corresponding to the peak frequencies extracted by the peak extracting unit 73a. Then, the control object is transitioned to the pairing unit 73c. At this time, the incident angles include angles influenced phase wrapping, and are estimates of the angles at which the targets exist. Therefore, the incident angles will be referred to as estimate angles.

On the basis of the calculation results of the azimuth calculating unit 73b, the pairing unit 73c determines correct pairs of peak frequencies of the UP sections and the DOWN sections, and calculates the distance and relative velocity of each target from the pairing results. Then, the control object is transitioned to the continuity determining unit 73d.

In order to facilitate understanding of the following description, the sequence of the above-described processes of the signal processing unit 7 will be described with reference to FIG. 3 and FIGS. 4A to 4C.

Figure 3:
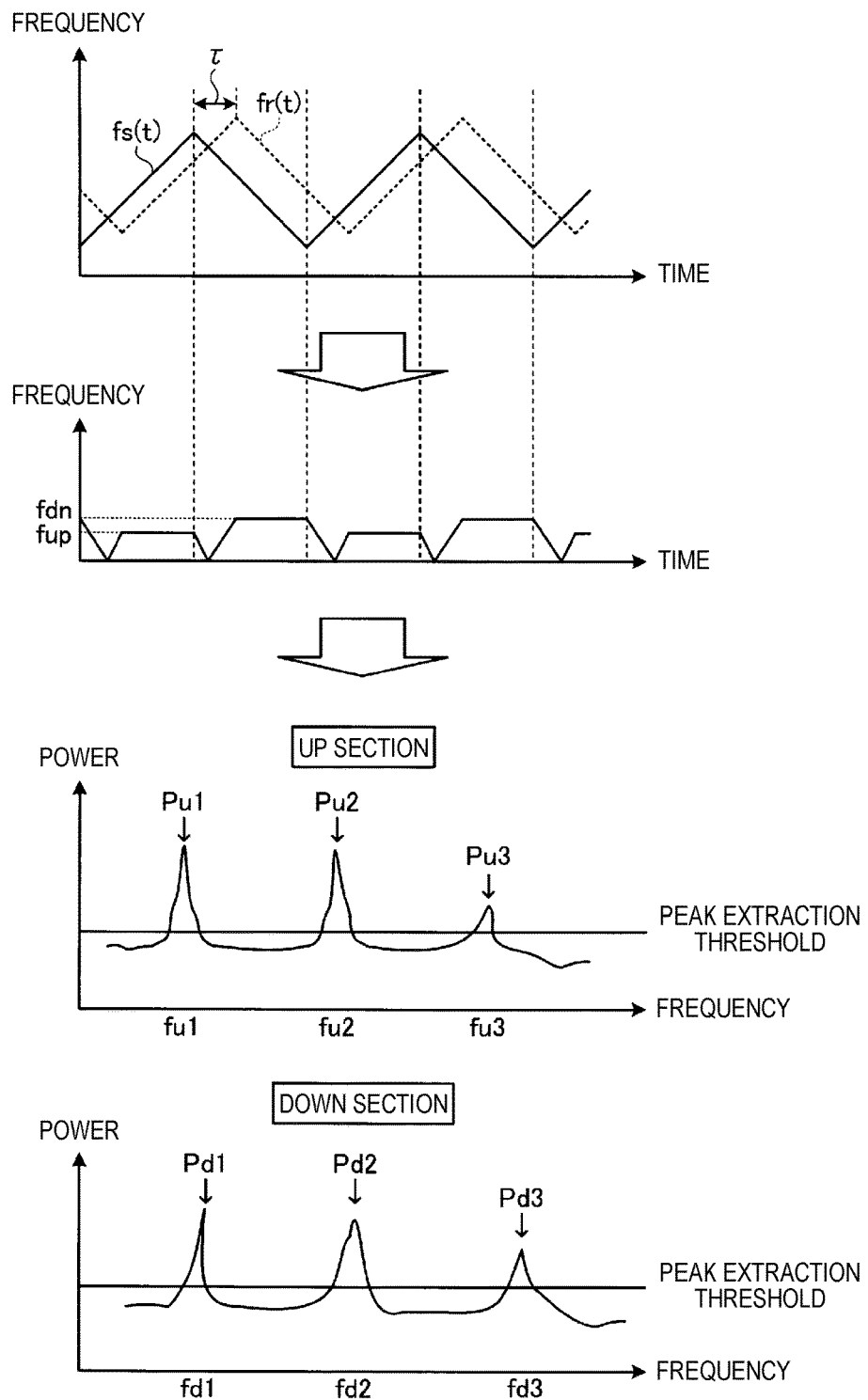
FIG. 3 is a view for explaining a procedure from a preliminary process for a signal processing device to a peak extracting process of the signal processing device.
Figure 4A:
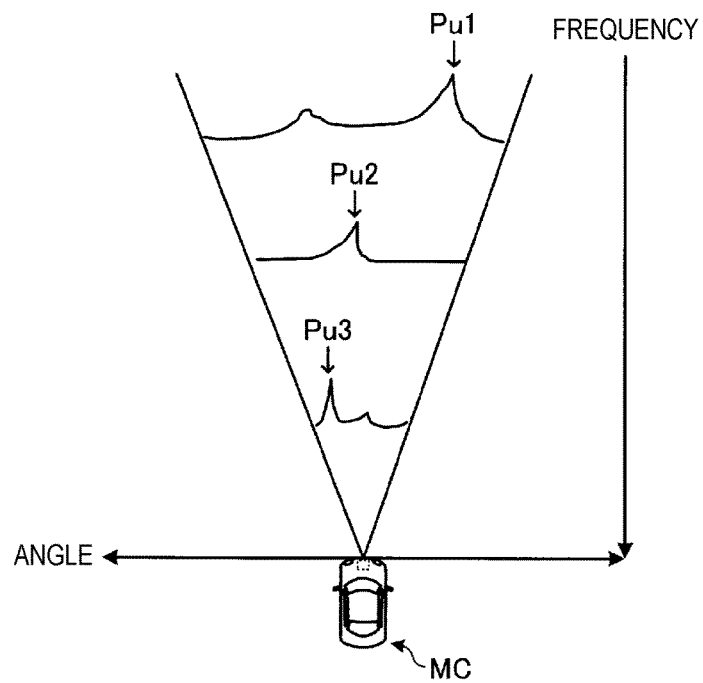
FIG. 4A is a view for explaining an azimuth calculating process.
Figure 4B:
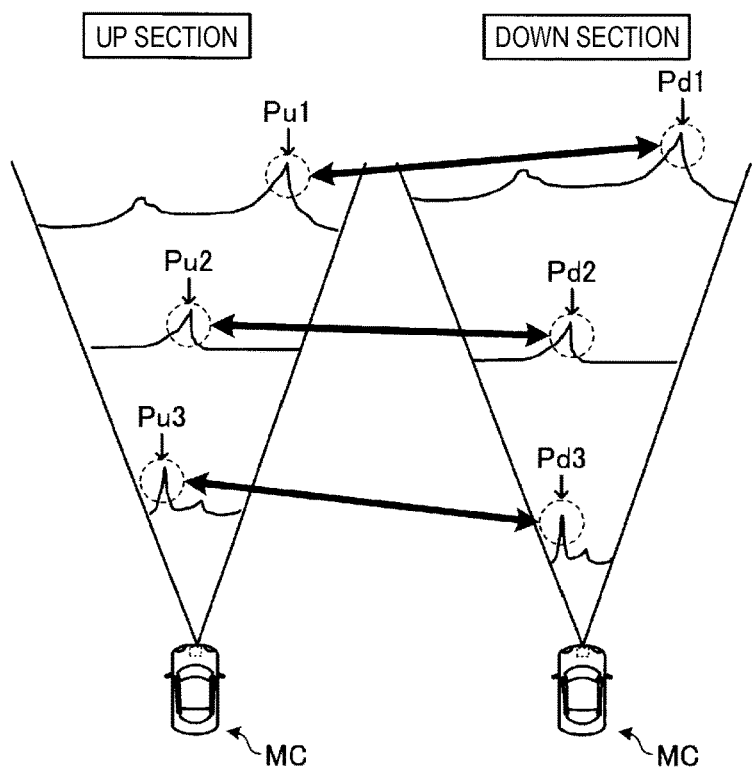
FIG. 4B is a view for explaining a first part of a pairing process.
Figure 4C:
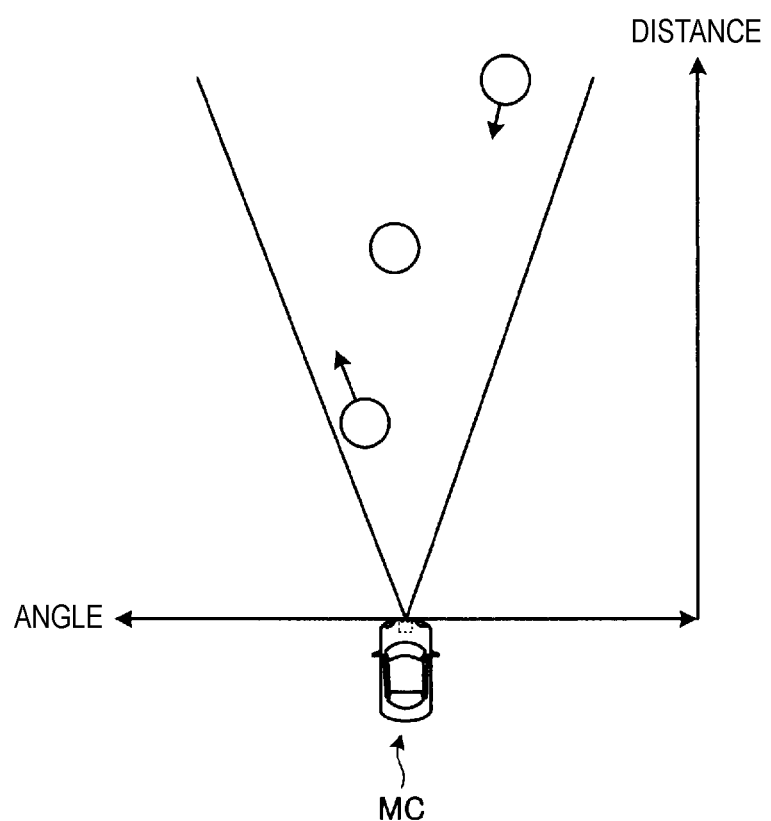
FIG. 4C is a view for explaining a second part of the pairing process.

FIG. 3 is a view for explaining the procedure from the preliminary process for the signal processing unit 7 to the peak extracting process of the signal processing unit 7. Also, FIG. 4A is a view for explaining the azimuth calculating process. Also, FIGS. 4B and 4C are views for explaining first and second parts of the pairing process, respectively.

Also, FIG. 3 has three areas divided by two white bold down arrows. Those areas hereinafter will be referred to as an upper part, a middle part, and a lower part in the order of them.

As shown in the upper part of FIG. 3, after a transmission signal fs(t) is transmitted as a transmission wave from the transmitting antenna 4, if the reflected waves of the transmission wave from targets reaches the radar device, the reflected waves are received as a reception signal fr(t) by each receiving antenna 5.

In this case, as shown in the upper part of FIG. 3, with respect to the transmission signal fs(t), the reception signal fr(t) has a time lag τ according to the distance between the vehicle MC and the target. The reception signal fr(t) and the transmission signal fs(t) are mixed, whereby a beat signal is obtained as an output signal. In the beat signal, due to the Doppler effect based on the relative velocity between the vehicle MC and the target, the frequency fup of UP sections in which the frequency of the transmission signal increases and the frequency fdn of DOWN sections in which the frequency of the transmission signal decreases are repeated (see the middle part of FIG. 3).

The Fourier transform unit 72 performs Fourier transform on the beat signal, and the UP sections and the DOWN sections of the Fourier transform result are schematically shown in the lower part of FIG. 3.

In the frequency domain, the UP sections and the DOWN sections of the Fourier transform result have waveforms as shown in the lower part of FIG. 3. From those waveforms, the peak extracting unit 73a extracts peak frequencies of peaks.

For example, in the example shown in the lower part of FIG. 3, with reference to a peak extraction threshold, in the UP sections, peaks Pu1 to Pu3 are determined as peaks, and the peak frequencies fu1 to fu3 thereof are extracted.

Also, in the DOWN sections, similarly, with reference to the peak extraction threshold, peaks Pd1, Pd2, and Pd3 are determined as peaks, and the peak frequencies fd1, fd2, and fd3 thereof are extracted. The peak extraction threshold may be stored in the data handling information 74a in advance.

Meanwhile, some peak frequencies extracted by the peak extracting unit 73a may include frequency components corresponding to reflected waves from a plurality of targets. For this reason, the azimuth calculating unit 73b performs azimuth calculation on each of the peak frequencies, thereby analyzing whether a target corresponding to the corresponding peak frequency exists.

The azimuth calculating unit 73b performs the azimuth calculation using a predetermined incidence direction estimating method such as ESPRIT (Estimation of Signal Parameters via Rotational Invariance Techniques). However, the present invention is not limited thereto.

FIG. 4A is a view schematically illustrating the result of the azimuth calculation of the azimuth calculating unit 73b. From the peaks Pu1 to Pu3 of the azimuth calculation results, the azimuth calculating unit 73b calculates the estimate angles of targets corresponding to the peaks Pu1 to Pu3, respectively. Also, the magnitudes of the peaks Pu1 to Pu3 are handled as reception levels.

The azimuth calculating unit 73b performs the azimuth calculating process on each of the UP sections and the DOWN sections, as shown in FIG. 4B.

Then, on the basis of the azimuth calculation results of the azimuth calculating unit 73b, the pairing unit 73c performs pairing such that a peak of an UP section and a peak of a DOWN section constituting each pair have similar estimate angles and similar reception levels, as shown in FIG. 4B.

Also, on the basis of the pairs of peaks, the pairing unit 73c calculates the distance and relative velocity of each of the targets corresponding to the pairs of peaks. The distance of each target is calculated on the basis of the following relationship: $[\text{Distance}] \propto (\text{fup}-\text{fdn})$. The relative velocity of each target is calculated on the basis of the following relationship: $[\text{Velocity}] \propto (\text{fup}-\text{fdn})$. As a result, as shown in FIG. 4C, pairing results representing the estimate angles, distances, and relative velocities of the individual targets relative to the vehicle MC (see white circles in FIG. 4C) are obtained.

Hereinafter, FIG. 2 will be further described with respect to the continuity determining unit 73d. With respect to the instantaneous value of each of the targets obtained as determination objects by the current scanning, the continuity determining unit 73d determines whether the corresponding instantaneous value has continuity with any target detected by the previous scanning. Then, the control object is transitioned to the filter unit 73e. Specifically, the continuity determining unit calculates estimate positions of current positions from target positions obtained by the previous scanning, and if an instantaneous value obtained in the current scanning is close to an estimate position, the continuity determining unit determines that the corresponding instantaneous value has continuity.

The filter unit 73e averages instantaneous value data obtained by a plurality of times of scanning, thereby suppressing variation based on instantaneous value data item obtained by performing scanning once, and performs a filtering process for improving the accuracy of detected target positions. Then, the control object is transitioned to the target classifying unit 73f. The target classifying unit 73f classifies the targets into moving objects (such as preceding vehicles LC and oncoming vehicles) and still objects S on the basis of the data processing results obtained by the previous processing units such as the filter unit 73e. Then, the control object is transitioned to the unnecessary-object determining unit 73g.

The unnecessary-object determining unit 73g determines whether each target is unnecessary for system control. Then, the control object is transitioned to the grouping unit 73*h*. Examples of unnecessary targets include targets corresponding to ghosts which are caused by wrapping attributable to phase differences exceeding 360 degrees, targets corresponding to reflection of constructions and walls, and so on. Also, basically, unnecessary targets are not output to any external device; however, they may be held inside.

If some of a plurality of targets detected as actually existing targets are estimated to be reflection points of the same object, the grouping unit 73*h* groups those targets into one target. Then, the control object is transitioned to the vertical axis-misalignment determining unit 73*i*.

The vertical axis-misalignment determining unit 73*i* performs an upward-axis-misalignment determining process or a downward-axis-misalignment determining process on the transmission axis CL of the radar device 1. At the same time, the vertical axis-misalignment determining unit 73*i* performs a running-state determining process. Also, on the basis of the result of the running-state determining process and the result of either the upward-axis-misalignment determining process or the downward-axis-misalignment determining process, the vertical axis-misalignment determining unit 73*i* determines whether it is necessary to output a diagnosis representing that axis misalignment in the vertical direction has occurred. Then, the control object is transitioned to the output target selecting unit 73*j*. In a case where it is necessary to output a diagnosis, the vertical axis-misalignment determining unit 73*i* outputs the diagnosis output to an external device. The external diameter is, for example, a vehicle control device 10.

Figure 5:
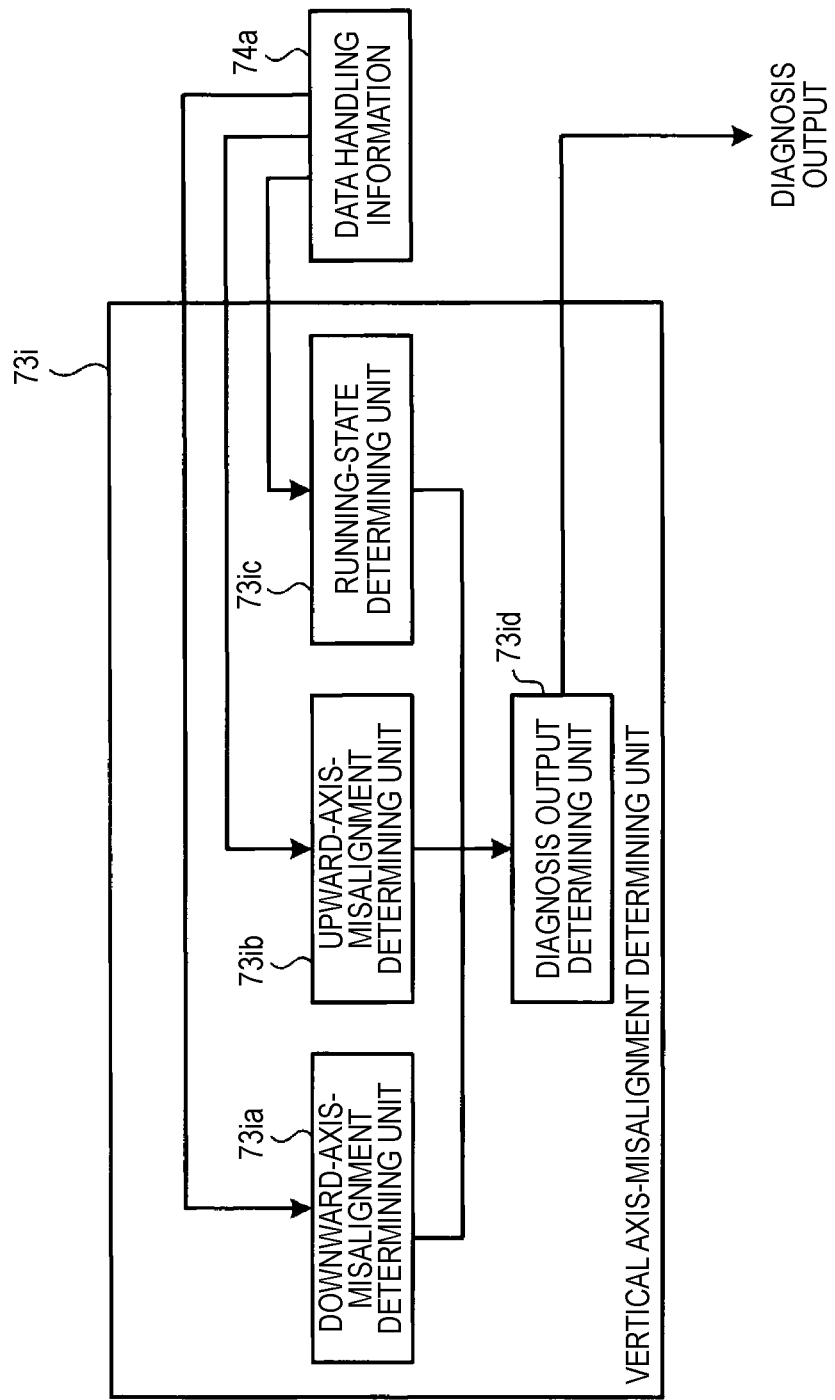
FIG. 5 is a block diagram illustrating a vertical axis-misalignment determining unit.

Now, the vertical axis-misalignment determining process which is performed by the vertical axis-misalignment determining unit 73*i* will be described in more detail FIGS. 5 to 6F. FIG. 5 is a block diagram illustrating the vertical axis-misalignment determining unit 73*i*. Also, FIGS. 6A to 6F are views for explaining first to sixth parts of the vertical axis-misalignment determining process, respectively.

As shown in FIG. 5, the vertical axis-misalignment determining unit 73*i* includes a downward-axis-misalignment determining unit 73*ia*, an upward-axis-misalignment determining unit 73*ib*, a running-state determining unit 73*ic*, and a diagnosis output determining unit 73*id*. Each of the downward-axis-misalignment determining unit 73*ia*, the upward-axis-misalignment determining unit 73*ib*, and the running-state determining unit 73*ic* performs a process on the basis of the data handling information 74*a* including the data processing results of the processing units 73*a* and 73*h*.

In a case where the velocity of the vehicle MC is equal to or higher than a predetermined velocity, the downward-axis-misalignment determining unit 73*ia* determines whether a peak exists in a search range corresponding to a frequency bin corresponding to a shorter distance area on the road G and depending on the vehicle velocity (hereinafter, such a peak will be referred to as a road peak). In a case where a peak exists in the search range for a predetermined time, the downward-axis-misalignment determining unit 73*ia* determines that downward axis misalignment has occurred.

In the case where the velocity of the vehicle MC is equal to or higher than the predetermined velocity, the upward-axis-misalignment determining unit 73*ib* determines the frequency of detecting still objects S in the lane of the vehicle MC up to the short distance area, and if the frequency is high, the upward-axis-misalignment determining unit determines that upward axis misalignment has occurred.

Also, for example, in a case where the vehicle is running in a tunnel having a very low ceiling, the upward-axis-misalignment determining unit may erroneously determine that upward axis misalignment has occurred. In order to prevent such an erroneous determination, in a case where an upper object (such as a still object existing above the lane of the vehicle MC) has a predetermined feature, the upward-axis-misalignment determining unit 73*ib* can perform an exception handling process such that it does not determine that upward axis misalignment has occurred.

The running-state determining unit 73*ic* determines whether the vehicle is in the running state on the basis of whether it is possible to detect still objects S. The running-state determining unit 73*ic* performs such determination in each of the FMCW mode and the CW mode. In a case where a still object S is detected, the running-state determining unit 73*ic* determines that the vehicle in the running state.

When the downward-axis-misalignment determining unit 73*ia* determines that downward axis misalignment has occurred, or the upward-axis-misalignment determining unit 73*ib* determines that upward axis misalignment has occurred, and the running-state determining unit 73*ic* determines that the vehicle in the running state, the diagnosis output determining unit 73*id* determines that axis misalignment in the vertical direction has occurred, and output the diagnosis to the external device. The content of the output may include a variety of information such as type information representing whether the occurred misalignment is upward axis misalignment or downward axis misalignment.

Hereinafter, the vertical axis-misalignment determining process will be further described. Also, in the present embodiment, a case where a distance within which it is possible to detect preceding vehicles LC is 50 m or less is used as an index representing that the detection performance of the radar device 1 has deteriorated due to axis misalignment in the vertical direction. In this case, a reference value for determining axis misalignment in the vertical direction is 5 (deg). When the transmission axis is deviated downward or upward from it right position by 5 degrees or more, it determined that axis misalignment in the vertical direction has occurred. In the following description, numerical values to be given as specific examples are based on the above-mentioned reference value.

Figure 6A:
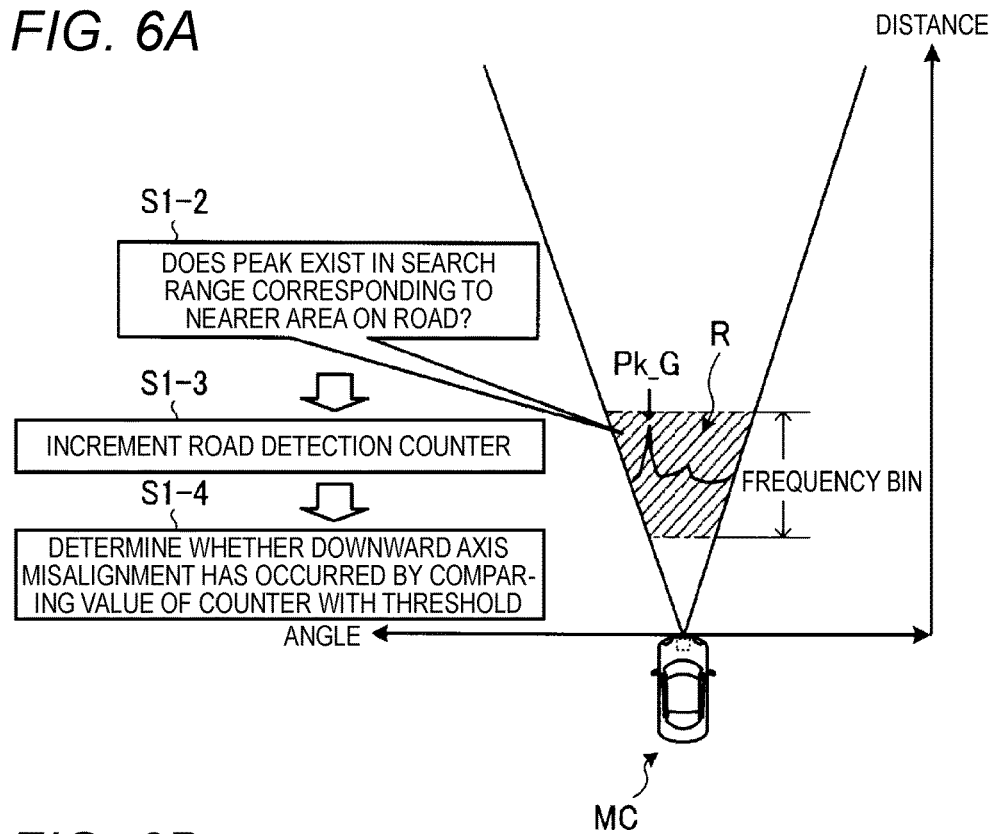
FIG. 6A is a view for explaining a first part of a vertical axis-misalignment determining process.
Figure 6B:
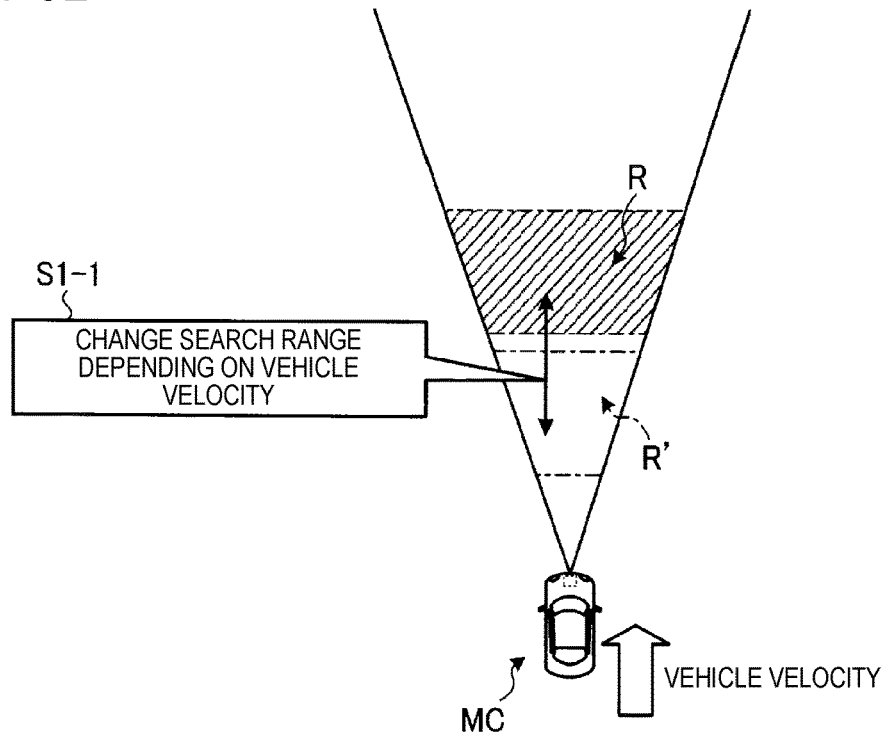
FIG. 6B is a view for explaining a second part of the vertical axis-misalignment determining process.

FIG. 6A and FIG. 6B show the content of the downward-axis-misalignment determining process which is performed by the downward-axis-misalignment determining unit 73*ia*. As shown in FIG. 6A, in a case where the velocity of the vehicle MC is equal to or higher than the predetermined velocity (for example, 40 km/h), in STEP S1-1, the downward-axis-misalignment determining unit 73*ia* determines whether a road peak Pk_G exists in a search range R corresponding to a frequency bin corresponding to a shorter distance area on the road G.

Since a search range R depends on the velocity of the vehicle MC subsequently equal to the relative velocity of the road G detected as one still object S, as shown in FIG. 6B, the downward-axis-misalignment determining unit 73*ia* calculates frequencies bin according to vehicle velocities on the basis of the relationship "[Velocity](fup−fdn)", in advance, and sets search ranges R changeably depending on the calculated frequency bins (in FIG. 6B, a search range R' is just a range different from the search range R). In other words, in STEP S1-1, the downward-axis-misalignment determining unit 73*ia* changes a search range R depending on the velocity of the vehicle.

Therefore, it is possible to detect road reflection of the road G in an appropriate short distance range depending on the velocity of the vehicle. In other words, it is possible to contribute to high-accuracy detection on downward axis misalignment.

Also, as shown in FIG. 6A, if it is determined in STEP S1-2 that a road peak Pk_G exists, in STEP S1-3, the downward-axis-misalignment determining unit 73ia increments a road detection counter representing a time for which the road G has been detected. Then, in STEP S1-4, the downward-axis-misalignment determining unit compares the value of the counter with a threshold, thereby determining whether the short distance area on the road G has been detected for a predetermined time, thereby determining that downward axis misalignment has occurred.

For example, the search range R corresponds to a road distance range from 0.3 m to 3 m (corresponding to downward axis misalignment corresponding to 5 degrees or more), and the threshold for the road detection counter corresponds to 4 minutes to 40 minutes.

As described above, it is possible to accurately detect downward axis misalignment by the downward-axis-misalignment determining process shown in FIGS. 6A and 6B.

Figure 6C:
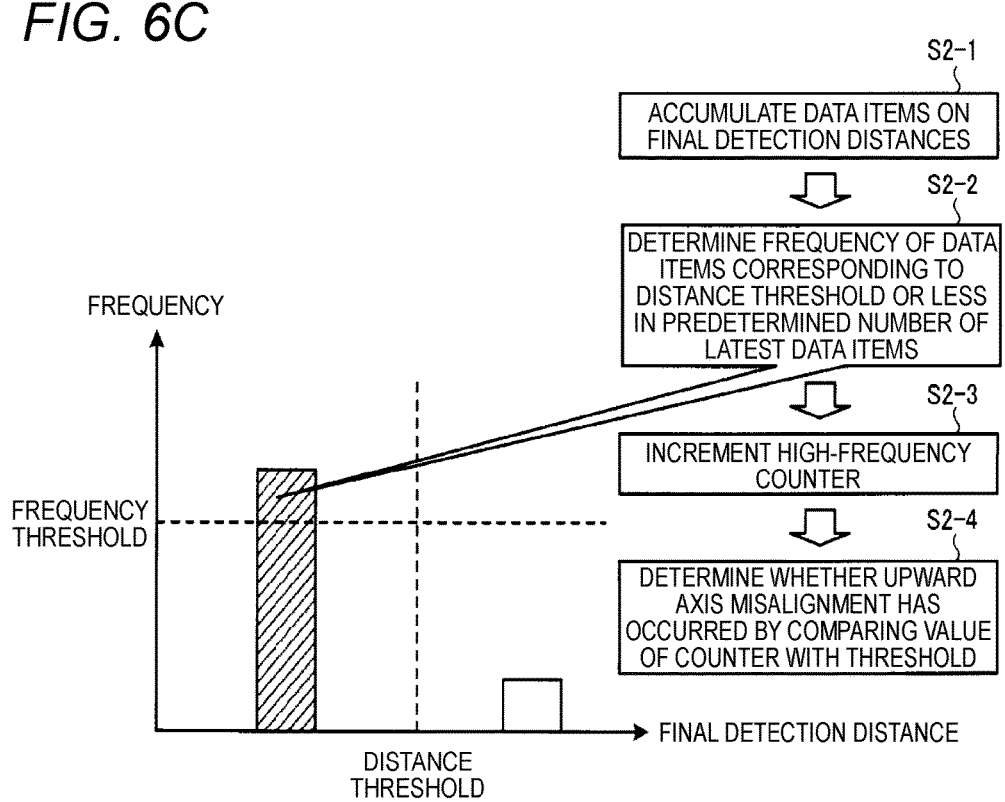
FIG. 6C is a view for explaining a third part of the vertical axis-misalignment determining process.
Figure 6D:
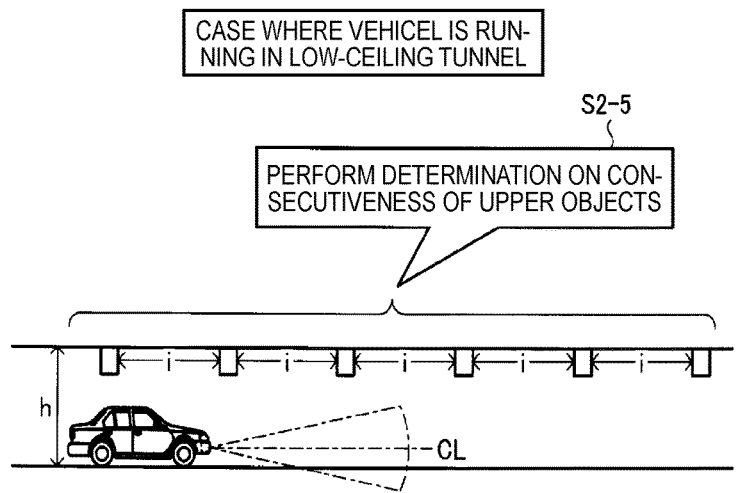
FIG. 6D is a view for explaining a fourth part of the vertical axis-misalignment determining process.

FIGS. 6C and 6D show the content of the upward-axis-misalignment determining process which is performed by the upward-axis-misalignment determining unit 73ib. As shown in FIG. 6C, in a case where the velocity of the vehicle MC is equal to or higher than the predetermined velocity (for example, 40 km/h), in STEP S2-1, the upward-axis-misalignment determining unit 73ib accumulates data items on the final detection distances Md of still objects S.

Then, in STEP S2-2, the upward-axis-misalignment determining unit determines the frequency of data items corresponding to a distance threshold or less in a predetermined number of latest data items (for example, 20 data items). For example, the distance threshold is 30 m, and the frequency threshold is 18. In this case, if eighteen or more data items corresponding to final detection distances Md of 30 m or less appear in twenty data items, that is, the appearance frequency is 90% or more, in STEP S2-3, the upward-axis-misalignment determining unit 73ib determines that the frequency is high, and increments a high-frequency counter. Subsequently, in STEP S2-4, the upward-axis-misalignment determining unit 73ib compares the value of the high-frequency counter with a threshold, thereby determining that the frequency of the final detection distance Md of the shorter distance area for a predetermined time is high, thereby determining that upward axis misalignment has occurred.

The exception handling process of the upward-axis-misalignment determining process is performed, for example, in a case where the vehicle MC is running in a tunnel having a low ceiling shown in FIG. 6D. A low-ceiling tunnel is, for example, a tunnel having such ceiling height that trucks cannot pass through the tunnel. Since a lot of tunnels have a feature in which upper objects such as constructions are installed at a regular interval i, in the case where the vehicle MC is running in a tunnel, in STEP S2-5, the upward-axis-misalignment determining unit 73ib performs determination on consecutiveness of upper objects. In a case where consecutiveness of upper objects is validated, the upward-axis-misalignment determining unit does not determine that upward axis misalignment has occurred. Therefore, it is possible to prevent erroneous upward axis misalignment determination in a situation in which it should be determined that upward axis misalignment has not occurred, like in a situation in which the vehicle is running in a low-ceiling tunnel.

As described above, by the upward-axis-misalignment determining process shown in FIGS. 6C and 6D, it is possible to detect upward axis misalignment with high accuracy.

Figure 6E:
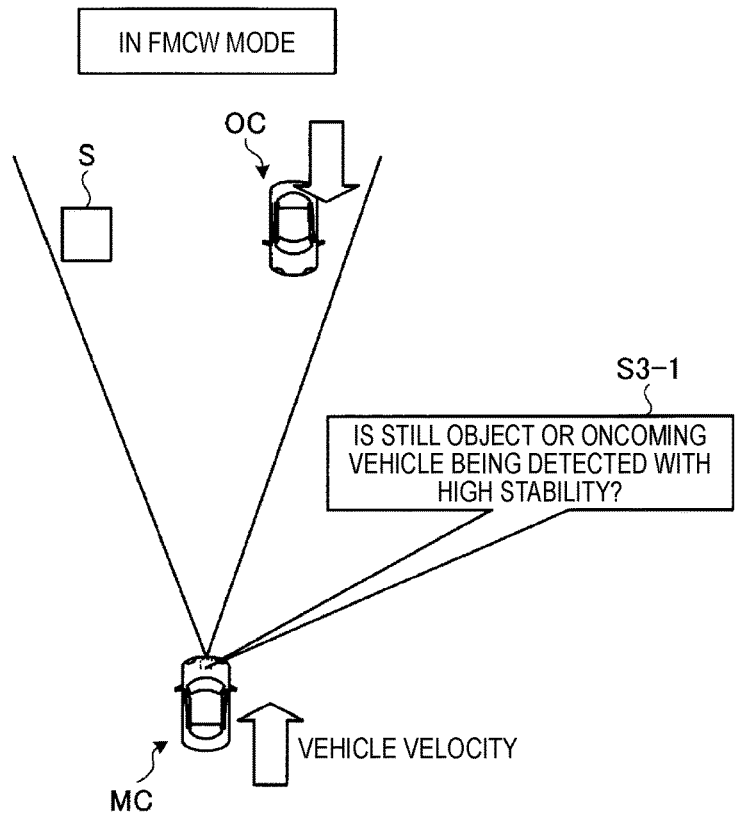
FIG. 6E is a view for explaining a fifth part of the vertical axis-misalignment determining process.
Figure 6F:
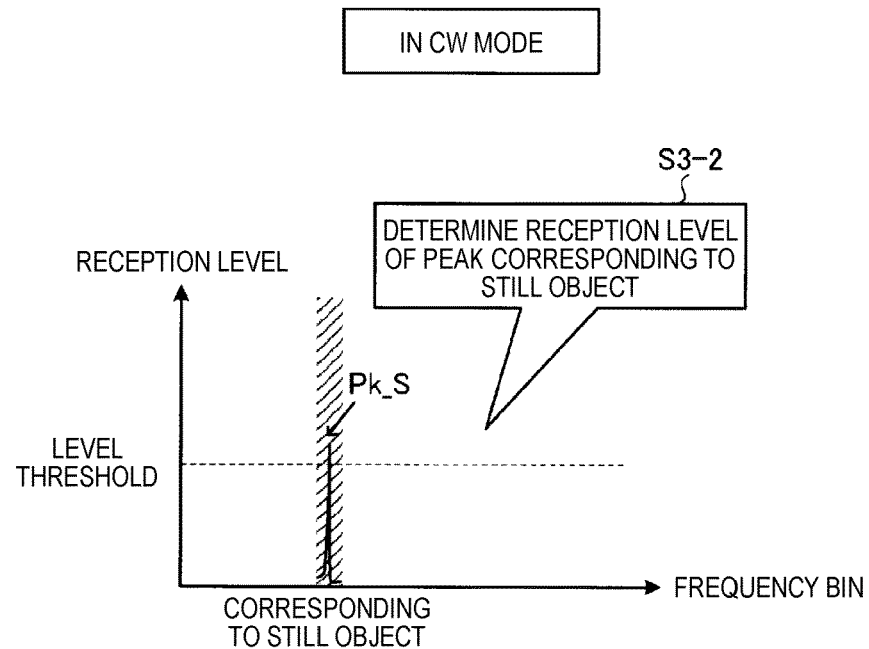
FIG. 6F is a view for explaining a sixth part of the vertical axis-misalignment determining process.

FIGS. 6E and 6F show the content of the running-state determining process which is performed by the running-state determining unit 73ic. As shown in FIG. 6E, first, in the FMCW mode, in a case where the velocity of the vehicle MC is equal to or higher than the predetermined velocity (for example, 40 km/h), in STEP S3-1, the running-state determining unit 73ic determines whether a still object S or an oncoming vehicle OC is being detected with high stability.

Here, stability is based on the appropriateness of pairing performed with respect to one target, for example, in the above-described pairing process, and can be evaluated, for example, using an FMCW counter which is decremented if inappropriate pairing (hereinafter, referred to as mispairing) has been performed between an UP section and a DOWN section, and is incremented if appropriate pairing has been performed.

Specifically, in the case where the vehicle MC is on the above-described chassis dynamometer SD, the radar device may erroneously determine a still object S or an oncoming vehicle OC as an actually existing target, due to mispairing. In this case, the radar device erroneously determines that the vehicle is in the running state. Such erroneous determination can be prevented by performing STEP S3-1. As a result, it is possible to perform running-state determination with high accuracy.

Also, as shown in FIG. 6F, in the CW mode, since it is possible to grasp frequency bins in which peaks Pk_G corresponding to still objects S will appear, from the velocity of the vehicle MC, in STEP S3-2, the running-state determining unit 73ic determines whether the reception level of a peak Pk_G appearing in each frequency bin is equal to or higher than a predetermined level threshold, thereby determining whether a corresponding still object S exists. Whenever a still object S is detected, the running-state determining unit 73ic increments, for example, a CW counter.

Further, in a case where the value of the FMCW counter and the value of the CW counter are equal to or larger than predetermined thresholds, respectively, the running-state determining unit 73ic determines that the vehicle MC is in the running state.

As described above, by the running-state determining process shown in FIGS. 6E and 6F, it is possible to detect whether the vehicle MC is in the running state.

Hereinafter, FIG. 2 will be further described with respect to the output target selecting unit 73j. The output target selecting unit 73j selects targets which need to be output to the external device for system control. Therefore, on the basis of the determination results of the unnecessary-object determining unit 73g and so on, the output target selecting unit 73j does not select targets determined as unnecessary targets, as output objects. Therefore, it is possible to prevent erroneous system control. Also, the output target selecting unit 73j outputs target information items on the selected targets (including the actual angles, the actual distances, the actual relative velocities, and so on) to the external device, for example, the vehicle control device 10.

The vehicle control device 10 is an electronic control unit (ECU) for controlling the component units of the vehicle MC. The vehicle control device 10 is electrically connected, for example, to a vehicle velocity sensor 11 and a steering angle sensor 12.

On the basis of the target information items acquired from the radar device 1, the vehicle control device 10 performs vehicle control such as adaptive cruise control (ACC) or pre-crash safety system (PCS) control.

For example, in a case of performing ACC, the vehicle control device 10 controls a throttle and a brake (not shown in the drawings) on the basis of the target information target information items acquired from the radar device 1, such that the vehicle MC follows a preceding vehicle while keeping a constant distance between the vehicle MC and the preceding vehicle. Also, since the running condition of the vehicle MC frequently varies, whenever the running state changes, the vehicle control device 10 acquires the vehicle velocity, the steering angle, and so on from the vehicle velocity sensor 11, the steering angle sensor 12, and so on, and feeds back the acquired information to the radar device 1.

Also, for example, in a case of performing PCS control, if it is detected on the basis of the target information items acquired from the radar device 1 that there is a preceding vehicle LC or a still object S in the traveling direction of the vehicle MC, and the vehicle MC is likely to collide with that, the vehicle control device 10 decelerates the vehicle MC by controlling the brake. Also, for example, the vehicle control device warns people riding in the vehicle MC by an alarm, or tightens up the seat belts in the vehicle, thereby holding the people in the seats.

Figure 7A:
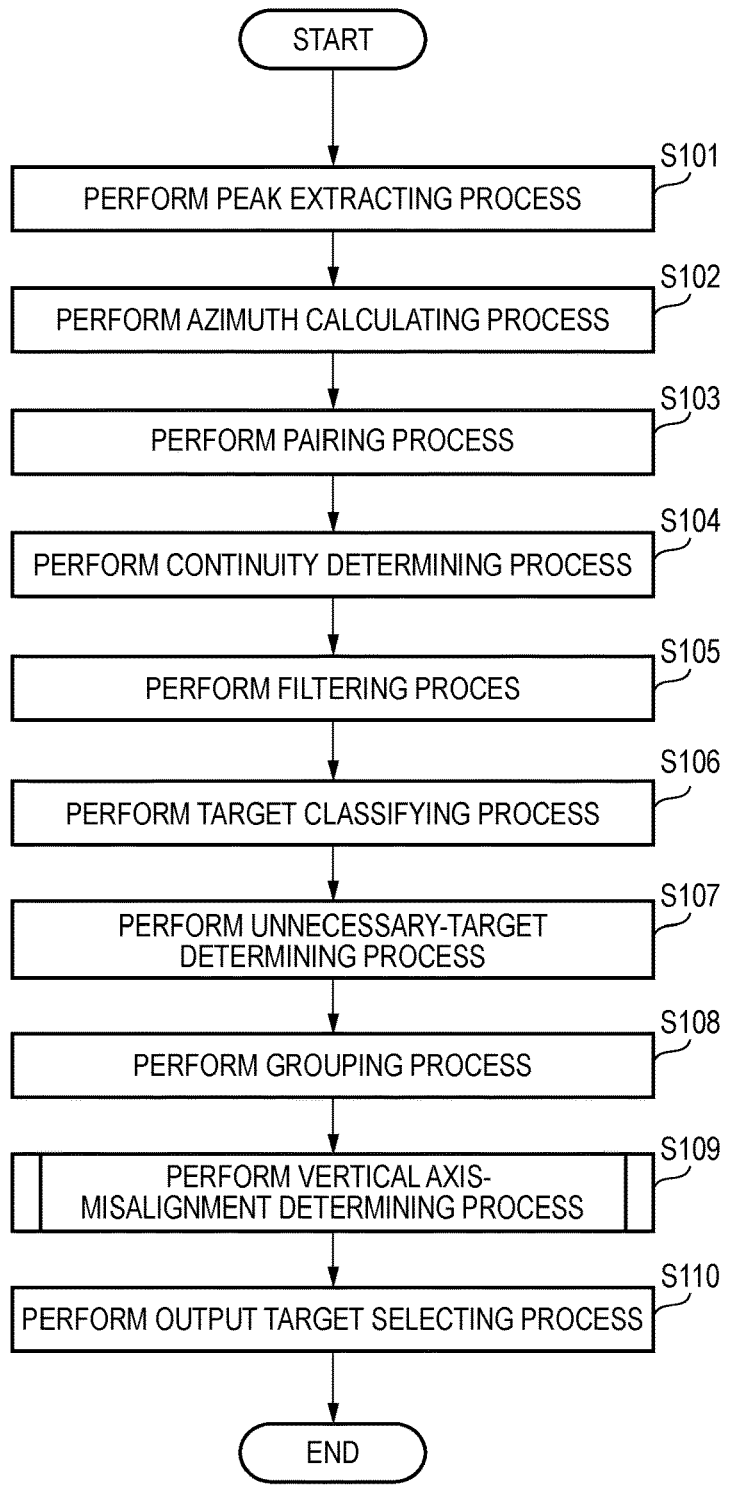
FIG. 7A is a flow chart illustrating the procedure of processes which are performed by a data processing unit of the radar device according to the embodiment.

Now, the procedure of processes which are performed by the data processing unit 73 of the radar device 1 according to the present embodiment will be described with reference to FIGS. 7A to 7E. FIG. 7A is a flow chart illustrating the procedure of processes which are performed by the data processing unit 73 of the radar device 1 according to the embodiment. Also, FIGS. 7B to 7E are flow charts illustrating first to fourth parts of the procedure of the upward-axis-misalignment determining process, respectively.

As shown in FIG. 7A, first, in STEP S101, the peak extracting unit 73a performs the peak extracting process. Subsequently, in STEP S102, the azimuth calculating unit 73b performs the azimuth calculating process on the basis of the result of the peak extracting process.

Subsequently, in STEP S103, the pairing unit 73c performs the pairing process on the basis of the result of the azimuth calculating process.

Subsequently, in STEP S104, the continuity determining unit 73d performs the continuity determining process on the basis of the results of STEPS S101 to 103 such as the pairing process. Subsequently, in STEP S105, the filter unit 73e performs the filtering process on the basis of the results of STEPS S101 to 104 such as the continuity determining process.

Subsequently, in STEP S106, the target classifying unit 73f performs a target classifying process on the basis of the results of STEPS S101 to 105 such as the filtering process. Next, in STEP S107, the unnecessary-object determining unit 73g performs an unnecessary-target determining process on the basis of the results of STEPS S101 to 106 such as the target classifying process. Subsequently, in STEP S108, the grouping unit 73h performs a grouping process on the basis of the results of STEPS S101 to 107 such as the unnecessary-target determining process.

Next, in STEP S109, the vertical axis-misalignment determining unit 73i performs the vertical axis-misalignment determining process on the basis of the results of STEPS S101 to 108 such as the grouping process.

Figure 7B:
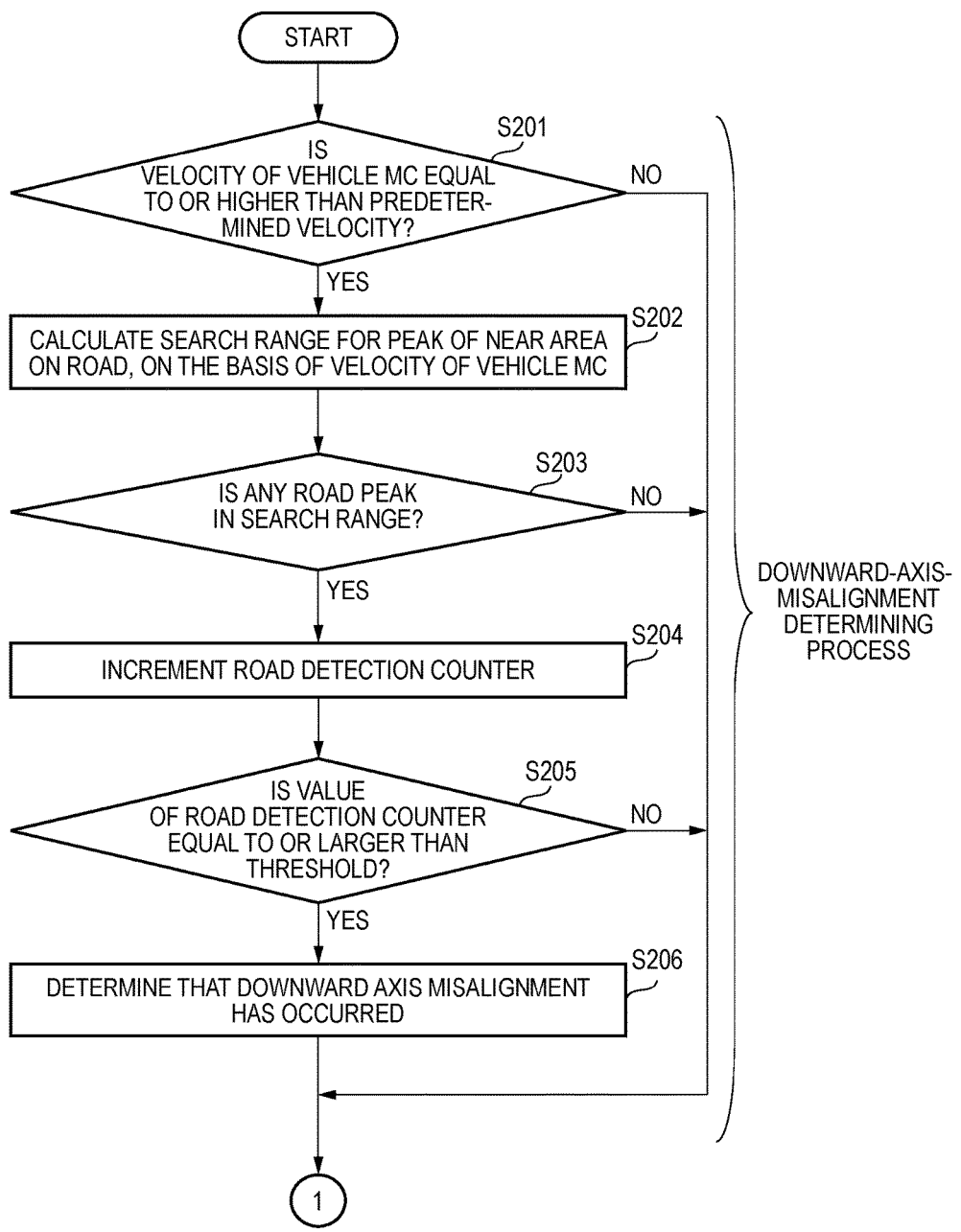
FIG. 7B is a flow chart illustrating the procedure of a first part of the vertical axis-misalignment determining process.

Now, the procedure of the vertical axis-misalignment determining process will be described. FIG. 7B shows the procedure of the downward-axis-misalignment determining process. As shown in FIG. 7B, in the downward-axis-misalignment determining process, in STEP S201, the downward-axis-misalignment determining unit 73ia determines whether the velocity of the vehicle MC is equal to or higher than the predetermined velocity.

In a case where the velocity of the vehicle MC is equal to or higher than the predetermined velocity ("Yes" in STEP S201), in STEP S202, the downward-axis-misalignment determining unit 73ia calculates a search range R for a peak Pk_G of the short distance area on the road, on the basis of the velocity of the vehicle MC.

Subsequently, in STEP S203, the downward-axis-misalignment determining unit 73ia determines whether there is a road peak Pk_G in the search range R. In a case where there is a road peak Pk_G in the search range R ("Yes" in STEP S205), in STEP S204, the downward-axis-misalignment determining unit 73ia increments the road detection counter.

Subsequently, in STEP S205, the downward-axis-misalignment determining unit 73ia determines whether the value of the road detection counter is equal to or larger than the predetermined threshold. In a case where the value of the road detection counter is equal to or larger than the predetermined threshold ("Yes" in STEP S205), in STEP S206, the downward-axis-misalignment determining unit 73ia determines that downward axis misalignment has occurred.

Meanwhile, in a case where any one of the determination conditions of STEPS S201, S203, and S205 is not satisfied ("No" in any one of STEPS S201, S203, and S205), the control proceeds to STEP S206.

Figure 7C:
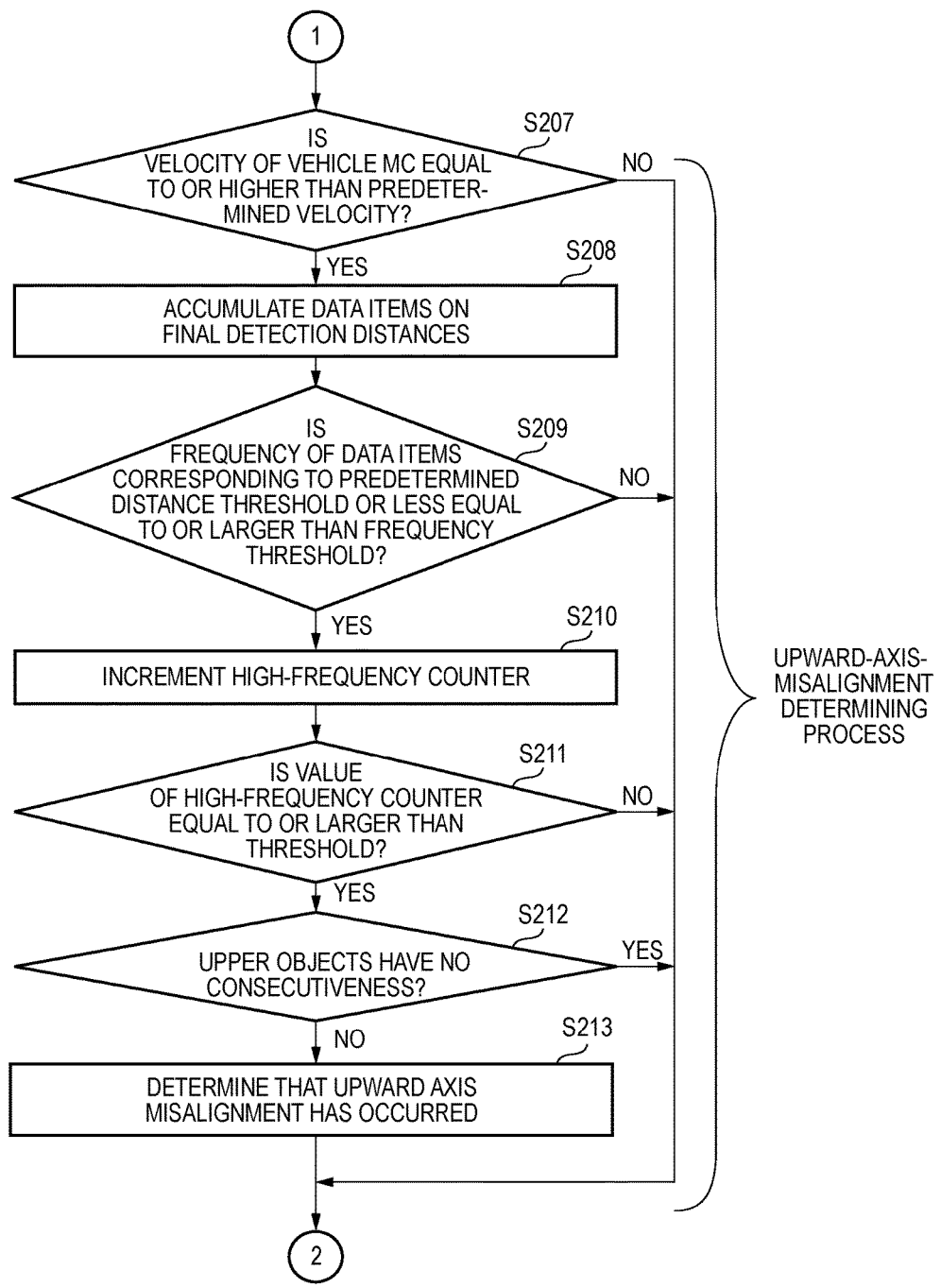
FIG. 7C is a flow chart illustrating the procedure of a second part of the vertical axis-misalignment determining process.

FIG. 7C shows the procedure of the upward-axis-misalignment determining process. As shown in FIG. 7C, in the upward-axis-misalignment determining process, in STEP S207, the upward-axis-misalignment determining unit 73ib determines whether the velocity of the vehicle MC is equal to or higher than the predetermined velocity.

In a case where the velocity of the vehicle MC is equal to or higher than the predetermined velocity ("Yes" in STEP S207), in STEP S208, the upward-axis-misalignment determining unit 73ib accumulates data items on the final detection distances Md of still objects S detected up to the short distances in the lane of the vehicle MC.

Subsequently, in STEP S209, the upward-axis-misalignment determining unit 73ib determines whether the frequency of data items corresponding to the predetermined distance threshold or less in a predetermined number of latest data items is equal to or larger than the predetermined frequency threshold.

In a case where the determination condition of STEP S209 is satisfied ("Yes" in STEP S209), in STEP S210, the upward-axis-misalignment determining unit 73ib increments the high-frequency counter.

Subsequently, in STEP S211, the upward-axis-misalignment determining unit 73ib determines whether the value of the high-frequency counter is equal to or larger than the predetermined threshold. In a case where the value of the high-frequency counter is equal to or larger than the predetermined threshold ("Yes" in STEP S211), in STEP S212, the upward-axis-misalignment determining unit 73ib determines whether upper objects have no consecutiveness.

In a case where upper objects have no consecutiveness ("No" in STEP S212), in STEP S213, the upward-axis-misalignment determining unit 73ib determines that upward axis misalignment has occurred.

Meanwhile, in a case where any one of the determination conditions of STEPS S207, S209, S211, and S212 is not satisfied ("No" in any one of S207, S209, S211, or "Yes" in STEP S212), the control proceeds to STEP S214.

Figure 7D:
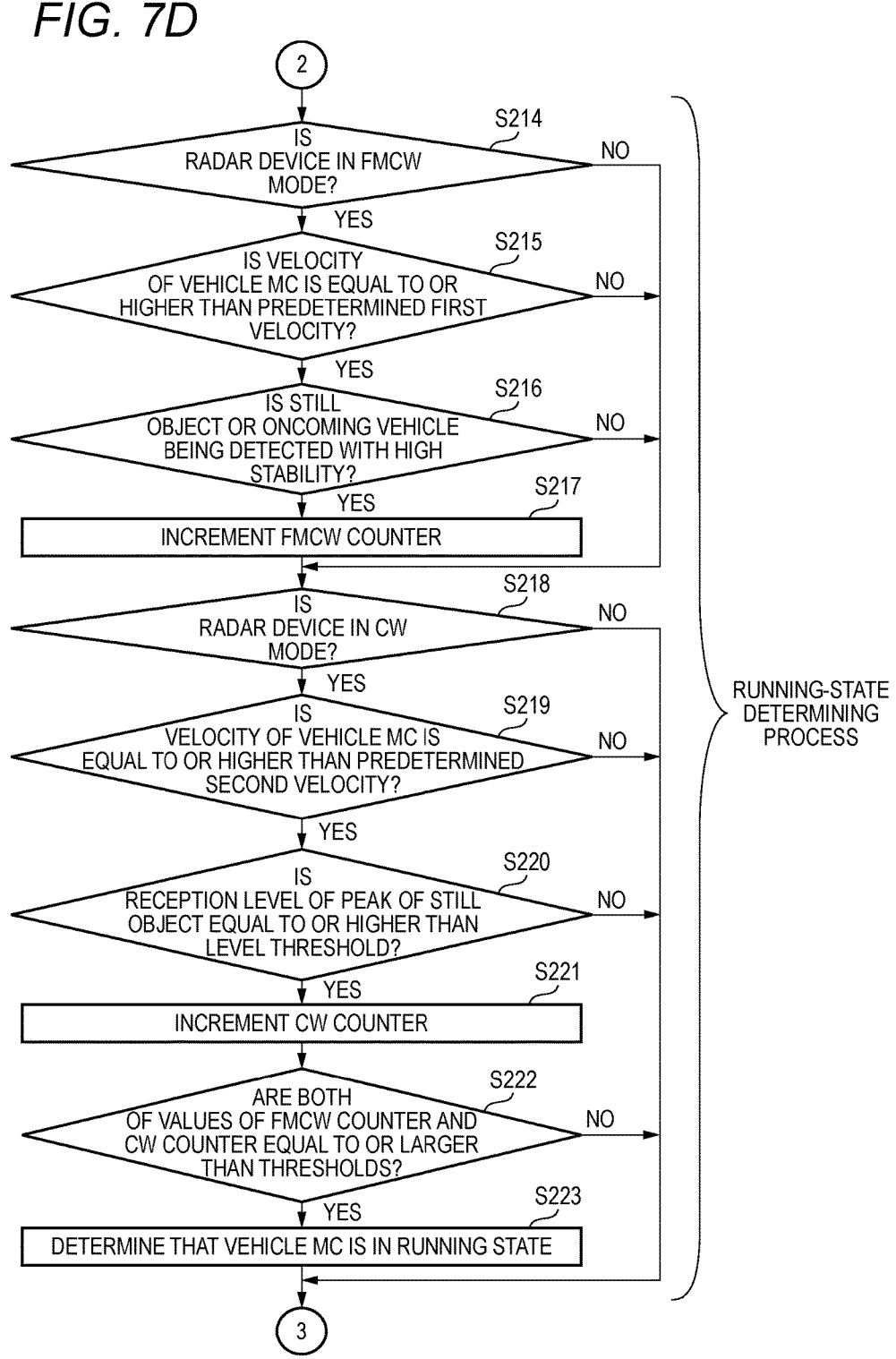
FIG. 7D is a flow chart illustrating the procedure of a third part of the vertical axis-misalignment determining process.

FIG. 7D shows the procedure of the running-state determining process. As shown in FIG. 7D, in the running-state determining process, in STEP S214, the running-state determining unit 73*ic* determines whether the radar device is in the FMCW mode.

In a case where the radar device is in the FMCW mode ("Yes" in STEP S214), in STEP S215, the running-state determining unit 73*ic* determines whether the velocity of the vehicle MC is equal to or higher than a predetermined first velocity.

In a case where the vehicle MC is equal to or higher than the predetermined first velocity ("Yes" in STEP S215), in STEP S216, the running-state determining unit 73*ic* determines whether a still object S or an oncoming vehicle OC is being detected with high stability.

In a case where the determination condition of STEP S216 is satisfied ("Yes" in STEP S216), in STEP S217, the running-state determining unit 73*ic* increments the FMCW counter.

In a case where any one of the determination conditions of STEPS S214 to S216 ("No" in STEPS S214 to S216), the control proceeds to STEP S218.

In STEP S218, the running-state determining unit 73*ic* determines whether the radar device is in the CW mode.

In a case where the radar device is in the CW mode ("Yes" in STEP S218), in STEP S219, the running-state determining unit 73*ic* determines whether the velocity of the vehicle MC is equal to or higher than a predetermined second threshold.

In a case where the velocity of the vehicle MC is equal to or higher than the predetermined second threshold ("Yes" in STEP S219), in STEP S220, the running-state determining unit 73*ic* determines whether the reception level of a peak Pk_G corresponding to a still object is equal to or higher than the predetermined level threshold.

In a case where the determination condition of STEP S220 is satisfied ("Yes" in STEP S220), in STEP S221, the running-state determining unit 73*ic* increments the CW counter. Subsequently, in STEP S222, the running-state determining unit 73*ic* determines whether both of the values of the FMCW counter and the CW counter are equal to or larger than predetermined thresholds.

In a case where the determination condition of STEP S222 is satisfied ("Yes" in STEP S222), in STEP S223, the running-state determining unit 73*ic* determines that the vehicle is in the running state.

Meanwhile, in a case where any one of the determination conditions of STEPS S218 to S220 and STEP S222 ("No" in STEPS S218 to S220 and STEP S222), the control proceeds to STEP S223.

Figure 7E:
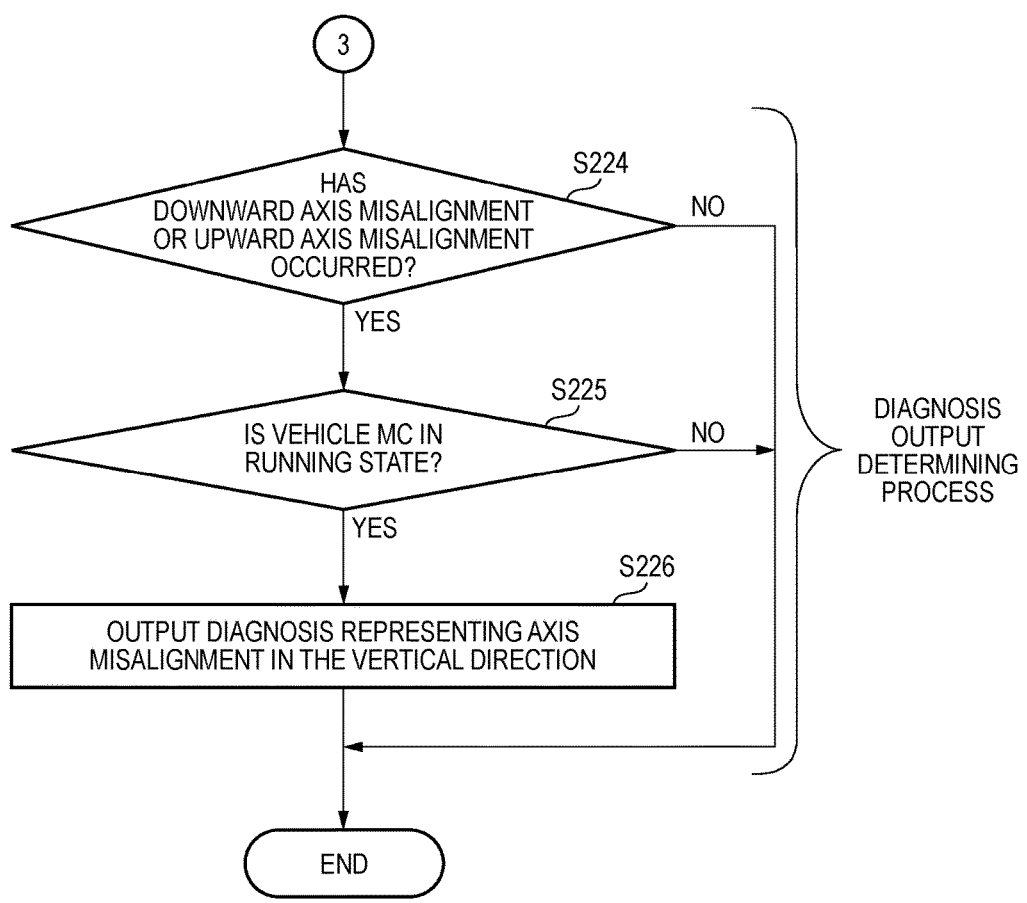
FIG. 7E is a flow chart illustrating the procedure of a fourth part of the vertical axis-misalignment determining process.

FIG. 7E shows the procedure of a diagnosis output determining process. As shown in FIG. 7E, in the diagnosis output determining process, in STEP S224, the diagnosis output determining unit 73*id* determines whether downward axis misalignment or upward axis misalignment has occurred.

In a case where the determination condition of STEP S224 is satisfied ("Yes" in STEP S224), in STEP S225, the diagnosis output determining unit 73*id* determines whether the vehicle MC is in the running state.

In a case where the vehicle MC is in the running state ("YES" in STEP S225), in STEP S226, the diagnosis output determining unit 73*id* determines that axis misalignment in the vertical direction has occurred, and outputs a diagnosis representing axis misalignment in the vertical direction. Then, the process finishes.

Meanwhile, in a case where any one of the determination conditions of STEPS S224 and S225 is not satisfied ("No" in any one of STEPS S224 and S225), the process finishes.

Hereinafter, FIG. 7A will be further described with respect to STEP S110. The output target selecting unit 73*j* performs the output target selecting process of STEP S110, on the basis of the results of the previous processes such as the vertical axis-misalignment determining process, and outputs target information items on targets selected as output objects. Then, the process is finishes.

As described above, the radar device 1 according to the present embodiment is mounted on the vehicle MC (corresponding to an example of a "moving object"), and detects targets on the basis of reception signals acquired by receiving reflected waves from the targets by the receiving antennae 5, and includes the signal transmitting unit 2 and the vertical axis-misalignment determining unit 73*i* (corresponding to an example of a "determining unit").

The signal transmitting unit 2 has the transmission axis CL substantially parallel to the traverse direction of the vehicle MC, and transmits transmission waves around the transmission axis CL as a center thereof. The vertical axis-misalignment determining unit 73*i* determines upward axis misalignment or downward axis misalignment of the transmission axis CL on the basis of reception signals acquired by receiving reflected waves of transmission waves.

Therefore, according to the radar device 1 of the present embodiment, it is possible to detect axis misalignment in the vertical direction with high accuracy.

In the above description embodiment, as an example, the radar device 1 has one transmitting antenna 4 and n-number of receiving antennae 5. However, as long as it is possible to detect a plurality of targets, the number of transmitting antennae and the number of receiving antennae may be changed.

Also, in the above-described embodiment, as an example of the incidence direction estimating method, ESPRIT has been taken. However, the present invention is not limited thereto. For example, DBF (Digital Beam Forming), PRISM (Propagator method based on an Improved Spatial-smoothing Matrix), MUSIC (Multiple Signal Classification), and so on may be used.

Also, in the above-described embodiment, the radar device 1 is installed on the vehicle MC. However, the radar device 1 may be installed on a moving object other than vehicles. Therefore, the above-described running state corresponds to an example of a moving state. Also, the velocity of the vehicle MC corresponds to an example of moving velocity. Further, the inside of the lane of the vehicle MC corresponds to an example of the inside of a movement path of the moving object.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device which is mounted on a moving object and configured to detect a target on the basis of reception signals acquired by receiving reflected waves from the target by receiving antennae, the radar device comprising:
a transmitter having a transmission axis substantially parallel to a traveling direction of the moving object and configured to transmit transmission waves around the transmission axis as a center thereof; and at least one processor programmed to determine upward axis misalignment or downward axis misalignment of the transmission axis, on the basis of the reception signals acquired by receiving the reflected waves of the transmission waves, wherein in a case where a velocity of the moving object is equal to or higher than a predetermined moving velocity, if a peak frequency corresponding to the target is extracted for a predetermined time from a search range of a frequency bin corresponding to a short distance area from the moving object and corresponding to deterioration of detection performance, the at least one processor determines that the transmission axis has the downward axis misalignment.

2. The radar device according to claim 1, wherein the at least one processor is programmed to change the search range depending on the moving velocity of the moving object.

3. The radar device according to claim 1, wherein in a case where the velocity of the moving object is equal to or higher than the predetermined moving velocity, the at least one processor accumulates data items on final detection distance of a still object detected within a movement path of the moving object up to a short distance, and in a case where a frequency of data items having values equal to or less than a predetermined distance threshold in a predetermined number of the accumulated data items is equal to or higher than a predetermined frequency threshold, the at least one processor determines that the transmission axis has the upward axis misalignment.

4. The radar device according to claim 3, wherein in a case where the still object existing in the movement path has a consecutiveness satisfying a predetermined condition, the at least one processor does not determine that the transmission axis has the upward axis misalignment.

5. The radar device according to claim 1, wherein in a case where the velocity of the moving object is equal to or higher than the predetermined moving velocity, and the target corresponding to the peak frequency extracted from the reception signals is determined as a still object, the at least one processor determines that the moving object is actually in a moving state.

6. The radar device according to claim 5,
wherein the transmitter transmits the transmission waves while switching between a FMCW mode and a CW mode, and
wherein in the FMCW mode, if the target is being detected as a still object with high stability on the basis of the peak frequency, the at least one processor determines that the moving object is actually in the moving state.

7. The radar device according to claim 6, wherein in the CW mode, if the reception level of the peak frequency corresponding to the target is equal to or higher than a predetermined threshold, the at least one processor determines that the moving object is actually in the moving state.

8. The radar device according to claim 1, wherein
the at least one processor is further programmed to:
detect the downward axis misalignment on the basis of a result of determination, and
determine whether the moving object is actually in a moving state, and
in a case where the at least one processor determines that the transmission axis has the downward axis misalignment and that the moving object is actually in the moving state, the at least one processor outputs information representing that the transmission axis has the downward axis misalignment, to an external device.

9. The radar device according to claim 1, wherein
the at least one processor is further programmed to:
detect the upward axis misalignment on the basis of a result of determination, and
determine whether the moving object is actually in a moving state, and
in a case where the at least one processor determines that the transmission axis has the upward axis misalignment and that the moving object is actually in the moving state, the at least one processor outputs information representing that the transmission axis has the upward axis misalignment, to an external device.

10. A vertical axis-misalignment detecting method of a radar device which is mounted on a moving object and configured to detect a target on the basis of reception signals acquired by receiving reflected waves from the target by receiving antennae, the vertical axis-misalignment detecting method comprising:
a transmitting process of transmitting transmission waves around a transmission axis as a center thereof, the transmission axis substantially parallel to a traveling direction of the moving object; and
a determining process of determining upward axis misalignment or downward axis misalignment of the transmission axis, on the basis of the reception signals acquired by receiving the reflected waves of the transmission waves, wherein
in a case where a velocity of the moving object is equal to or higher than a predetermined moving velocity, if a peak frequency corresponding to the target is extracted for a predetermined time from a search range of a frequency bin corresponding to a short distance area from the moving object and corresponding to deterioration of detection performance, determining that the transmission axis has the downward axis misalignment.

11. A radar device which is mounted on a moving object and configured to detect a target on the basis of reception signals acquired by receiving reflected waves from the target by receiving antennae, the radar device comprising:
a transmitter having a transmission axis substantially parallel to a traveling direction of the moving object and configured to transmit transmission waves around the transmission axis as a center thereof; and
at least one processor programmed to determine upward axis misalignment or downward axis misalignment of the transmission axis, on the basis of the reception signals acquired by receiving the reflected waves of the transmission waves, wherein
in a case where a velocity of the moving object is equal to or higher than a predetermined moving velocity, the at least one processor accumulates data items on final detection distance of a still object detected within a movement path of the moving object up to a short distance, and in a case where a frequency of data items having values equal to or less than a predetermined distance threshold in a predetermined number of the accumulated data items is equal to or higher than a predetermined frequency threshold, the at least one processor determines that the transmission axis has the upward axis misalignment.

12. The radar device according to claim 11, wherein in a case where the still object existing in the movement path has a consecutiveness satisfying a predetermined condition, the at least one processor does not determine that the transmission axis has the upward axis misalignment.

13. The radar device according to claim 11, wherein in a case where the velocity of the moving object is equal to or higher than the predetermined moving velocity, if a peak frequency corresponding to the target is extracted for a predetermined time from the search range of a frequency bin corresponding to a short distance area from the moving object and corresponding to deterioration of detection performance, the at least one processor determines that the transmission axis has the downward axis misalignment.

14. The radar device according to claim 13, wherein the at least one processor is programmed to change the search range depending on the moving velocity of the moving object.

15. The radar device according to claim 11, wherein in a case where the velocity of the moving object is equal to or higher than the predetermined moving velocity, and the target corresponding to a peak frequency extracted from the reception signals is determined as a still object, the at least one processor determines that the moving object is actually in a moving state.

16. The radar device according to claim 15,
wherein the transmitter transmits the transmission waves while switching between a FMCW mode and a CW mode, and
wherein in the FMCW mode, if the target is being detected as a still object with high stability on the basis of the peak frequency, the at least one processor determines that the moving object is actually in the moving state.

17. The radar device according to claim 16, wherein in the CW mode, if the reception level of the peak frequency corresponding to the target is equal to or higher than a predetermined threshold, the at least one processor determines that the moving object is actually in the moving state.

18. The radar device according to claim 11, wherein
the at least one processor is further programmed to:
    detect the downward axis misalignment on the basis of a result of determination, and
    determine whether the moving object is actually in a moving state, and
in a case where the at least one processor determines that the transmission axis has the downward axis misalignment and that the moving object is actually in the moving state, the at least one processor outputs information representing that the transmission axis has the downward axis misalignment, to an external device.

19. The radar device according to claim 11, wherein
the at least one processor is further programmed to:
    detect the upward axis misalignment on the basis of a result of determination, and
    determine whether the moving object is actually in a moving state, and
in a case where the at least one processor determines that the transmission axis has the upward axis misalignment and that the moving object is actually in the moving state, the at least one processor outputs information representing that the transmission axis has the upward axis misalignment, to an external device.

* * * * *